(12) United States Patent
Tollini et al.

(10) Patent No.: US 12,533,213 B2
(45) Date of Patent: Jan. 27, 2026

(54) INTRAORAL ASSEMBLY ALLOWING UNINHIBITED ENDOSCOPE AND OXYGEN ACCESS HAVING FRICTIONAL SECUREMENT MEANS

(71) Applicants: Dennis Tollini, Clarence Center, NY (US); Michael Tollini, Clarence Center, NY (US); Russell J. Grosjean, Orchard Park, NY (US); Edward McHugh, Hamburg, NY (US); Albert Diaz-Ordaz, Clarence, NY (US)

(72) Inventors: Dennis Tollini, Clarence Center, NY (US); Michael Tollini, Clarence Center, NY (US); Russell J. Grosjean, Orchard Park, NY (US); Edward McHugh, Hamburg, NY (US); Albert Diaz-Ordaz, Clarence, NY (US)

( * ) Notice: Subject to any disclaimer, the term of this patent is extended or adjusted under 35 U.S.C. 154(b) by 691 days.

(21) Appl. No.: 18/049,459

(22) Filed: Oct. 25, 2022

(65) Prior Publication Data
US 2023/0070412 A1 Mar. 9, 2023

Related U.S. Application Data

(63) Continuation-in-part of application No. 17/323,167, filed on May 18, 2021, now abandoned.

(51) Int. Cl.
*A61C 5/90* (2017.01)
(52) U.S. Cl.
CPC ...................................... *A61C 5/90* (2017.02)

(58) Field of Classification Search
CPC .... A61M 16/0495; A61B 90/16; A61B 13/00; A61B 10/04
See application file for complete search history.

(56) References Cited

U.S. PATENT DOCUMENTS

| | | | |
|---|---|---|---|
| 2,127,215 | A | 8/1938 | Gwathmey |
| 2,705,959 | A | 4/1955 | Elmore |
| 3,756,244 | A | 9/1973 | Kinnear et al. |
| 3,774,616 | A | 11/1973 | White et al. |

(Continued)

FOREIGN PATENT DOCUMENTS

WO    2008144768    11/2008

OTHER PUBLICATIONS

Classic Style Bite Block Helps Protect Teeth and Endoscopes, Shamn Anesthesia Inc., shamn.com, Jan. 8, 2000.

*Primary Examiner* — Valerie L Woodward
(74) *Attorney, Agent, or Firm* — Simpson & Simpson, PLLC

(57) ABSTRACT

An intraoral assembly for endoscopy, including a bite bar, including a tubular section including a first end and a second end, a first flange arranged at the first end having an indentation therein, a second flange arranged at the second end, and a first through-hole, and a tongue restraint, including, a proximal end, a distal end, a top surface, a bottom surface, a first side, a second side, and a hole extending from the proximal end to a location proximate the distal end, wherein the bite bar is adjustably and removably connectable to the tongue restraint. The tongue restraint having a pair of protrusions arranged in each of a pair of a channels. The tongue restraint having an extension arranged to be seated within the indentation of the bite bar.

20 Claims, 14 Drawing Sheets

(56) References Cited

U.S. PATENT DOCUMENTS

| | | | |
|---|---|---|---|
| 4,112,936 A * | 9/1978 | Blachly | A61M 16/0493 |
| | | | 128/207.14 |
| 4,919,126 A * | 4/1990 | Baildon | A61M 16/0497 |
| | | | 128/207.14 |
| 5,024,218 A | 6/1991 | Ovassapian et al. | |
| 5,355,874 A | 10/1994 | Bertram | |
| 6,098,617 A | 8/2000 | Connell | |
| 6,256,524 B1 | 7/2001 | Walker et al. | |
| 9,271,631 B2 | 3/2016 | Leeflang et al. | |
| 10,029,060 B2 | 7/2018 | McCauley | |
| 2004/0129272 A1 | 7/2004 | Ganesh et al. | |
| 2010/0030027 A1* | 2/2010 | Bastid | A61M 16/0497 |
| | | | 600/120 |
| 2012/0143003 A1* | 6/2012 | Anca | A61M 16/0497 |
| | | | 600/114 |
| 2014/0275784 A1 | 9/2014 | Joyce | |
| 2016/0101254 A1 | 4/2016 | Hansen et al. | |
| 2016/0192829 A1 | 7/2016 | Poulsen et al. | |
| 2018/0311455 A1 | 11/2018 | Simons | |

\* cited by examiner

INTRAORAL ASSEMBLY ALLOWING UNINHIBITED ENDOSCOPE AND OXYGEN ACCESS HAVING FRICTIONAL SECUREMENT MEANS

CROSS-REFERENCE TO RELATED APPLICATIONS

This application is a continuation-in-part of U.S. patent application Ser. No. 17/323,167, filed May 18, 2021, and claims priority thereto pursuant to 35 U.S.C. § 120, which application is incorporated by reference in its entirety.

FIELD

The invention relates generally to improved intraoral assemblies for endoscopy or oral surgery, and more particularly, to an intraoral assembly that fixates a patient's mouth, restrains a patient's tongue having an arrangement to frictionally secure to the intraoral assembly, and allows endoscope and oxygen access therethrough, where the intraoral assembly includes means to accept an oxygen line and $CO_2$ sensor line.

BACKGROUND

An endoscopy bite block or mouth prop is a wedge-shaped implement used in dentistry for dentists working with children and other patients who have difficulty keeping their mouths open wide and steady during a procedure, or during procedures where the patient is sedated, or for other endoscopy procedures. Bite blocks generally have a rubber-like texture and are typically made from thermoplastic vulcanizate (TPV) material. They come in several different sizes, from pediatric to adult, and are typically ridged as to use the teeth to hold them in place. These or similar procedures may also require the use of a tongue restraint that prevents the tongue from falling into the patient's throat during the procedure while under anesthesia. However, while bite blocks and tongue restraints can be useful, they inhibit the oral cavity such that it is difficult to pass not only an endoscope therethrough, but also an oxygen tube and/or carbon dioxide detection tube. Furthermore, current designs do not allow for fixation of bite blocks and tongue restrains together or for easy adjustability therebetween.

Snap-fit connections are commonplace for intraoral assemblies. This common attachment design presents issue with securing two pieces together such that the intended snap fit may not provide for proper frictional forces to maintain the snap-fit connection, or alternative, may wear-down from extending and repetitive use for reusable intraoral assemblies.

Therefore, there is a long-felt need for an intraoral assembly that allows for an adjustable connection between a bite bar and a tongue restraint and allows uninhibited access to the oral cavity for endoscopy, oxygen delivery, carbon dioxide detection, and an increased frictional connection between the bite bar and the tongue restraint—where the tongue restraint also includes a shorter and a longer configuration of connection to the bite bar, thereby accommodating different patient anatomies.

There is also a long-felt need for a tongue restraint of an intraoral assembly having a tapered channel to promote a friction-fit within the bite bar, where the tongue restraint also includes the adjustable connection with the bite bar.

There is a further long-felt need for an intraoral assembly having a bite bar, where the bite bar includes two apertures arranged to accept an oxygen line and a $CO_2$ sensor therein.

There is still a long-felt need for an intraoral assembly having a bite bar and a removably attached tongue restraint, where the tongue restraint includes means to provide for gas and/or fluid delivery to a patient through at least two exit points.

SUMMARY

According to aspects illustrated herein, there is provided an intraoral assembly for endoscopy, comprising a bite bar, including a tubular section comprising a first end and a second end, a first flange arranged at the first end, a second end arranged at the second end, and a first through-hole, and a tongue restraint, including, a proximal end, a distal end, a top surface, a bottom surface, a first side, a second side, and a hole extending from the proximal end to a location proximate the distal end, wherein the bite bar is adjustably and removably connectable to the tongue restraint.

In some embodiments, the tongue restraint is curvilinear toward the bottom surface. In some embodiments, the tongue restraint further comprises a first channel arranged in the first side, and a second channel arranged in the second side. In some embodiments, the bite bar further comprises a second through-hole extending radially outward from and connected to the first through-hole, the second through-hole comprising at least one protrusion operatively arranged to engage at least one of the first channel and the second channel. In some embodiments, the at least one protrusion comprises a first protrusion extending in a first direction and operatively arranged to engage the first channel, a second protrusion extending in a second direction, opposite the first direction, and operatively arranged to engage the second channel, wherein a space is arranged between the first protrusion and the second protrusion. In some embodiments, the tongue restraint further comprises a first notch in the bottom surface and extending from the first side and a second notch in the bottom surface and extending from the second side, and the first protrusion and the second protrusion are operatively arranged to engage the first notch and the second notch, respectively, to align the first protrusion and the second protrusion with the first channel and the second channel, respectively. In some embodiments, the location is an opening in the bottom surface. In some embodiments, the opening is connected to the distal end. In some embodiments, the location is at least one aperture extending from the first side to the second side. In some embodiments, the bite bar further comprises a protruding section extending radially outward from the tubular section, the protruding section comprising at least one through-bore. In some embodiments, the first through-hole comprises a first center axis, and the at least one through-bore comprises a second center axis, the second center axis being arranged at an angle relative to the first center axis, the angle being greater than zero. In some embodiments, the intraoral assembly further comprises a strap operatively arranged to be connected to the bite bar to secure the bite bar to a patient's head. In some embodiments, the intraoral assembly further comprises a port connected to the hole and extending from the proximal end. In some embodiments, the intraoral assembly further comprises a handle extending from the proximal end.

According to aspects illustrated herein, there is provided an adjustable intraoral assembly for endoscopy, comprising a bite bar, including a tubular section comprising a first end and a second end, a first flange arranged at the first end, a second end arranged at the second end, and a first through-hole, and a tongue restraint, including a proximal end, a distal end, a top surface, a bottom surface, a first side comprising a first channel, a second side comprising a second channel, and a hole extending from the proximal end to a location proximate the distal end, wherein the bite bar operatively arranged to be fixedly secured to the tongue restraint such that in a first assembly, the distal end is arranged at a first distance from the bite bar, and in a second assembly, the distal end is arranged at a second distance from the bite bar, the second distance being less than the first distance.

In some embodiments, the bite bar further comprises a second through-hole extending radially outward from the first through-hole, the second through-hole comprising a first protrusion extending in a first direction and operatively arranged to engage the first channel, and a second protrusion extending in a second direction, opposite the first direction, and operatively arranged to engage the second channel, wherein a space is arranged between the first protrusion and the second protrusion. In some embodiments, the tongue restraint further comprises a first notch in the bottom surface and extending from the first side and a second notch in the bottom surface and extending from the second side, and the first protrusion and the second protrusion are operatively arranged to engage the first notch and the second notch, respectively, to align the first protrusion and the second protrusion with the first channel and the second channel, respectively. In some embodiments, the first protrusion and the second protrusion engage the first channel and the second channel to create an interference fit. In some embodiments, the location is an opening in the bottom surface. In some embodiments, the location is at least one aperture extending from the first side to the second side.

According to aspects illustrated herein, there is provided an adjustable intraoral assembly for endoscopy, comprising a bite bar, including a tubular section comprising a first end and a second end and a first through-hole, a first flange arranged at the first end, a second end arranged at the second end, and a protruding section extending radially outward from the tubular section, the protruding section comprising a second through-hole having at least one protrusion, and a tongue restraint, including a proximal end, a distal end, a top surface, a bottom surface, a first side, a second side, at least one channel arranged in at least one of the first side and the second side, and a hole extending from the proximal end to a location proximate the distal end, wherein the bite bar is removably connectable to the tongue restraint via the at least one protrusion engaging the at least one channel.

According to aspects illustrated herein, there is provided a tongue restraint and bite bar assembly comprising a bite bar and a tongue restraint. The bite bar comprises an oval shaped center opening or aperture wherein an endoscope or other device can be manipulated. The bite bar comprises at least one, for example two, protrusions that extend radially inward into the ovular aperture, the protrusions forming slots. The tongue restraint generally comprises a curvilinear plate (i.e., the overall shape is flat and curved). The tongue restraint comprises side channels on both the left and right side when the tongue restraint is positioned, curved down, in the back of the patient's mouth. The tongue restraint comprises a tab or a spoon-shaped handle for positioning the assembly within the patient's mouth. The tongue restraint further comprises a port proximate the tab, the port being connected to a channel that runs along the length of the body of the tongue restraint (i.e., center hole). The port is operatively arranged to be connected to an oxygen source or oxygen machine to supply oxygen to the patient without disrupting the center opening. In some embodiments, the port opens at or proximate the distal end of the tongue restraint. In some embodiments, the port opens within the side channels of the tongue restraint. In some embodiments, the port opens at or proximate the distal end of the tongue restraint and within the side channels of the tongue restraint.

In some embodiments, the tongue restraint further comprises cutouts or notches on the bottom surface. The notches engage protrusions of the bite bar. After such engagement, when the bite bar is displaced in a first axial direction relative to the tongue restraint, the bite bar and the tongue restraint are fixedly secured via friction or interference fit creating a first arrangement. Also, after such engagement, when the bite bar is displaced in a second axial direction relative to the tongue restraint, opposite the first axial direction, the bite bar and the tongue restraint are fixedly secured via friction or interference fit creating a second arrangement. In the first arrangement, the intraoral assembly comprises a first length that is longer, for example, for overweight adults. In the second arrangement, the intraoral assembly comprises a second length that is shorter, for example, for children. It should be appreciated that any means suitable for adjustably connecting the bite bar and the tongue restraint may be used, for example, via pins, screws, set screws, dowels, snaps, etc.

In further embodiments, the present invention generally comprises an intraoral assembly for endoscopy having a bite bar. The bite bar includes a tubular section having a first end and a second end, a first flange arranged at the first end, a second flange arranged at the second end, a first through-hole, and an indentation arranged within the first flange, the indentation opening into the through-hole. The intraoral assembly for endoscopy also has a tongue restraint. The tongue restraint includes a proximal end, a distal end, a top surface, a bottom surface, a first side having a first channel arranged therein, the first channel having a channel protrusion arranged therein, a second side having a second channel arranged therein, the second channel having a channel protrusion arranged therein, and a hole extending from the proximal end to a location proximate the distal end, where the bite bar is adjustably and removably connectable to the tongue restraint. The tongue restrain further comprises an extension extending from the proximal end, the extension is further arranged to be frictionally seated within the indentation of the bite bar when the tongue restraint is connected to the bite bar.

In even further embodiments, the present invention also generally comprises an intraoral assembly including a bite bar, where the bite bar has a tubular section terminating at a pair of respective flanges arranged at opposite ends thereof, the tubular section including a through-bore therein, the through-bore having a channel disposed distally therein, the channel includes a pair of protrusions arranged oppositely within the channel, at least one of the pair of flanges including an indentation therein, the indentation open to the channel, a protruding section extending from the tubular section comprising at least one through-bore, and a tongue restraint, the tongue restraint having a proximal end, a distal end, an extension extending from the distal end, a first side having a first channel arranged therein, the first channel having a channel protrusion arranged therein, a second side having a second channel arranged therein, the second channel having a channel protrusion arranged therein, a hole extending from the proximal end to a location proximate the distal end, wherein the bite bar is adjustably and removably connectable to the tongue restraint.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
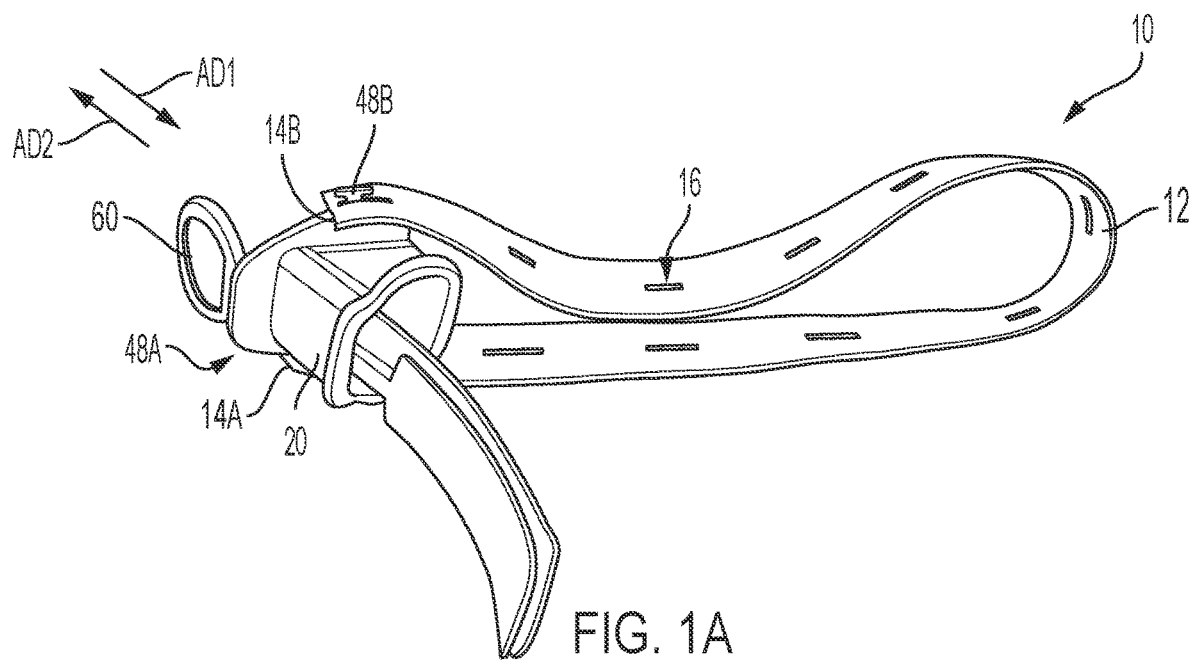
FIG. 1A is a perspective view of an intraoral assembly, in a first arrangement.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1B:
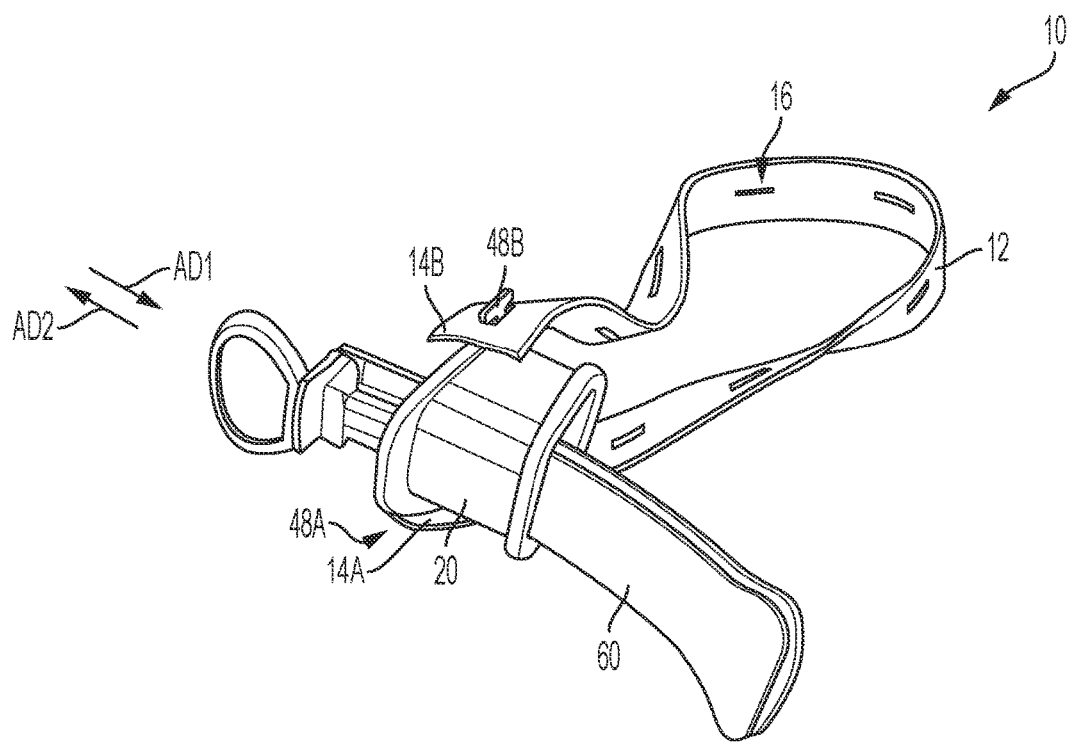
FIG. 1B is a perspective view of the intraoral assembly shown in FIG. 1A, in a second arrangement.

Adverting now to the figures, FIG. 1A is a perspective view of intraoral assembly 10, in a first arrangement. FIG. 1B is a perspective view of intraoral assembly 10, in a second arrangement. Intraoral assembly 10 generally comprises bite bar 20 and tongue restraint 60. In some embodiments, intraoral assembly 10 further comprises strap 12. As shown in FIG. 1A, bite bar 20 is displaced in axial direction AD2 after being engaged with tongue restraint 60. Thus, bite bar 20 is said to be engaged with a proximal end of tongue restraint 60 thereby forming a longer intraoral assembly 10. As shown in FIG. 1B, bite bar 20 is displaced in axial direction AD1 after being engaged with tongue restraint 60. Thus, bite bar 20 is said to be engaged with a central portion of tongue restraint 60 thereby forming a shorter intraoral assembly 10. Such assemblies will become more readily apparent in view of the following description.

Figure 2A:
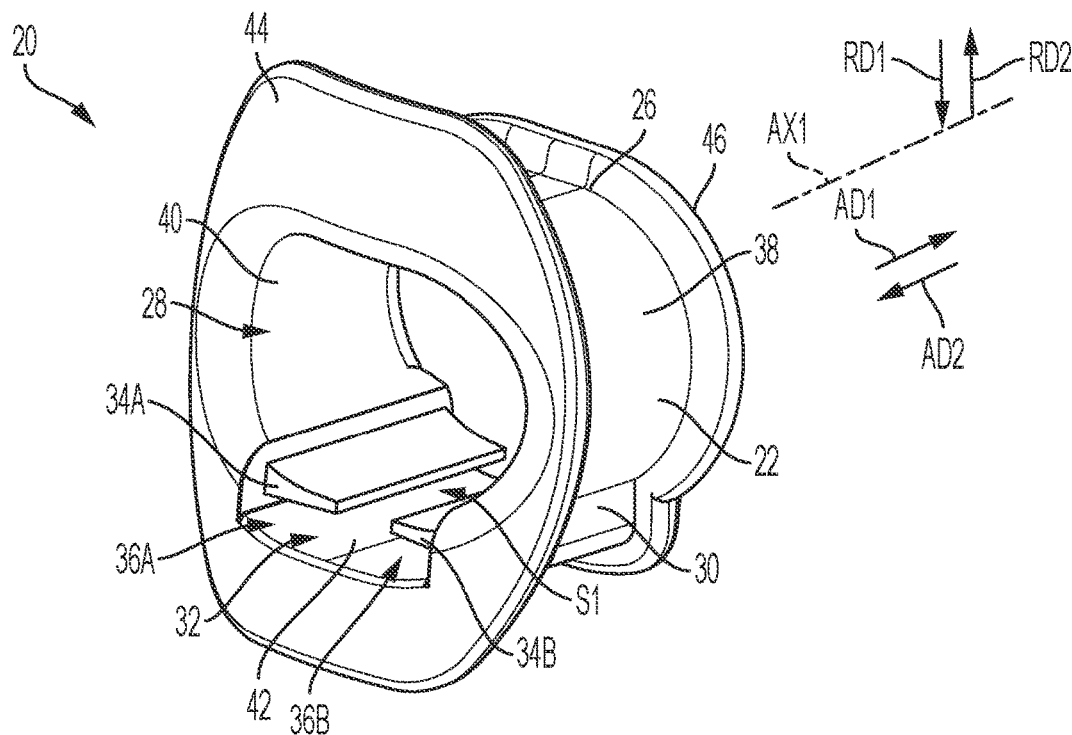
FIG. 2A is a front perspective view of a bite bar.
Figure 2B:
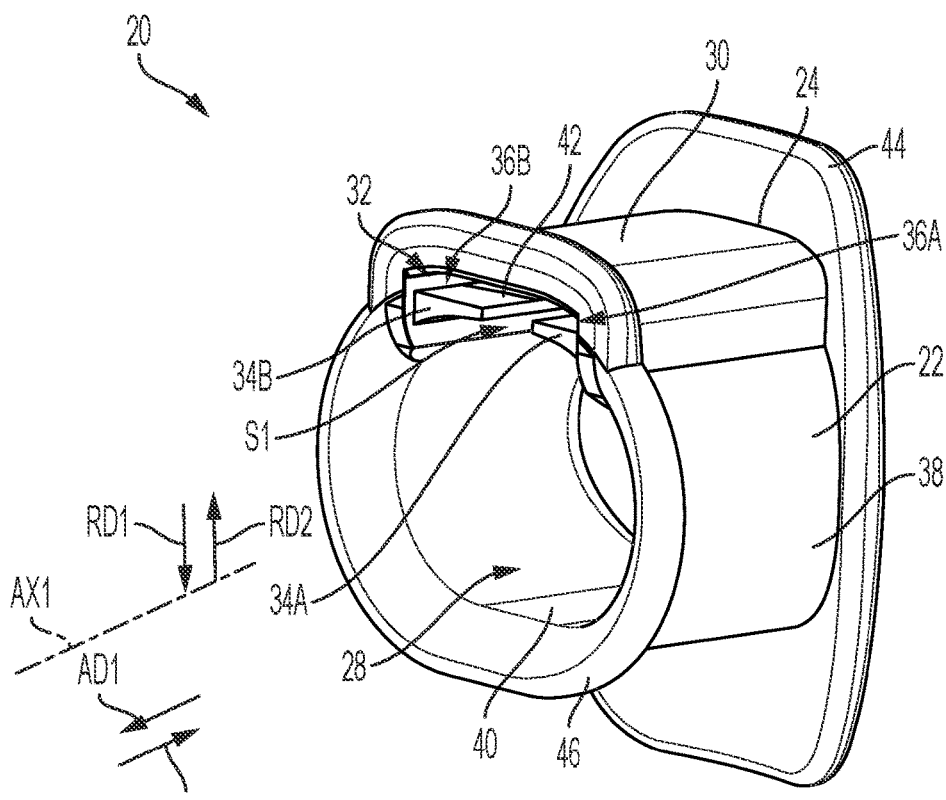
FIG. 2B is a rear perspective view of the bite bar shown in FIG. 2A.
Figure 2C:
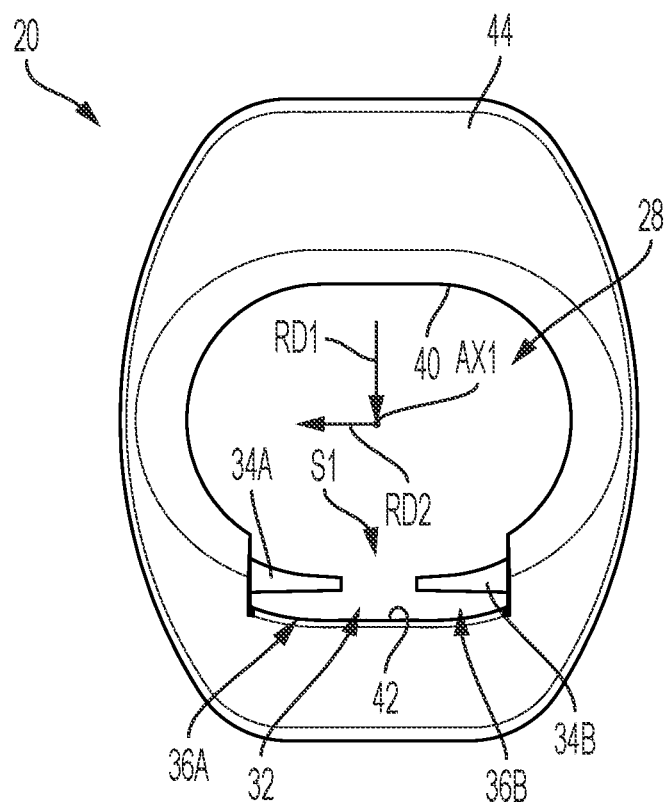
FIG. 2C is a front elevational view of the bite bar shown in FIG. 2A.
Figure 2D:
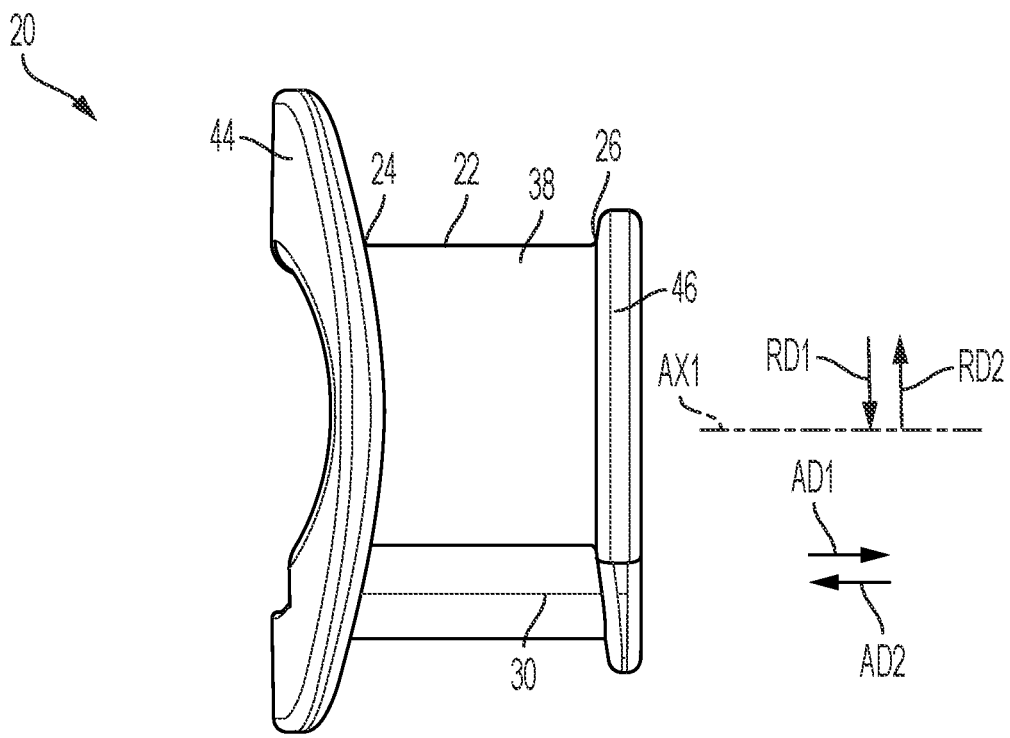
FIG. 2D is a side elevational view of the bite bar shown in FIG. 2A.

FIG. 2A is a front perspective view of bite bar 20. FIG. 2B is a rear perspective view of bite bar 20. FIG. 2C is a front elevational view of bite bar 20. FIG. 2D is a side elevational view of bite bar 20. Bite bar 20 generally comprises tubular section 22, protruding section 30, radially outward facing surface 38, flange 44, and flange 46. The following description should be read in view of FIGS. 1A-2D.

Tubular section 22 extends from end 24 to end 26 and comprises hole 28 forming radially inward facing surface 40. Hole 28 is a through-hole (i.e., extends completely through bite bar 20) generally comprising an oval or ellipse shaped geometry. The geometry of hole 28, as best shown in FIG. 2C, may comprises a linear top surface and a linear bottom surface, connected via two curvilinear side surfaces (i.e., similar to a super ellipse or a Cassini oval). Hole 28 extends completely through bite bar 20 (i.e., from end 24 to end 26 and through flanges 44 and 46). Axis AX1 runs through the center of hole 28. Hole 28 is operatively arranged to allow a medical professional to insert tools therethrough in order to work on a patient, for example, an endoscope.

Protruding section 30 extends from tubular section 22 generally in a radially outward direction, or in radial direction RD2. Protruding section 30 extends from end 24 to end 26 and comprises hole 32 forming radially inward facing surface 42. The geometry of hole 32, as best shown in FIG. 2C, is substantially rectangular. For example, hole 32 comprises a bottom surface (i.e., radially inward facing surface 42) and two side walls extending therefrom. In some embodiments, radially inward facing surface 42 may be curvilinear. Hole 32 opens into hole 28.

Protruding section 30 further comprises two protrusions 34A-B extending from the two side walls of hole 32. As shown, protrusion 34A extends from a first side wall of hole 32 and is spaced apart from radially inward facing surface 42 forming slot 36A. Protrusion 34B extends from a second side wall of hole 32, opposite the first side wall, and is spaced apart from radially inward facing surface 42 forming slot 36B. Space S1 is formed between protrusion 34A and 34B. Space S1 is operatively arranged to engage notches 74A-B such that protrusions 34A-B can frictionally engage channels 72A-B, as will be described in greater detail below. In some embodiments, protrusions 34A and 34B comprise a curvilinear top surface (i.e., surfaces facing radially inward in radial direction RD1).

Flange 44 is connected to end 24 and extends radially outward therefrom, generally in radial direction RD2. Flange 44 provides a first limit to bite bar 20. Specifically, flange 44 interacts with a patient's lips and/or teeth and/or face to prevent bite bar 20, and intraoral assembly 10, from falling into a patient's mouth or oral cavity. In some embodiments, and as shown, flange 44 is generally a curvilinear plate with hole 28 and hole 32 extending therethrough. The curvilinear shape of flange 44 is such that it resembles the curvature of a patient's face, thus providing a more comfortable and secure fit. In some embodiments, flange 44 is a planar plate with hole 28 and hole 32 extending therethrough.

Flange 46 is connected to end 26 and extends radially outward therefrom, generally in radial direction RD2. Flange 46 provides a second limit to bite bar 20. Specifically, flange 46 interacts with a patient's teeth to prevent bite bar 20, and intraoral assembly 10, from falling out of a patient's mouth or oral cavity. In some embodiments, and as shown, flange 46 is generally a planar plate with hole 28 and hole 32 extending therethrough. In some embodiments, flange 46 is a curvilinear plate with hole 28 and hole 32 extending therethrough.

Tubular section 22 and protruding section 30 form radially outward facing surface 38 of bite bar 20. Radially outward facing surface 38 is operatively arranged to engage a patient's teeth. Specifically, the patient is to bite on radially outward facing surface 38 to maintain the jaw in an open position. Flange 44 and flange 46 work in conjunction to maintain bite bar 20, and thus intraoral assembly 10, aligned with the patient's teeth.

Figure 3:
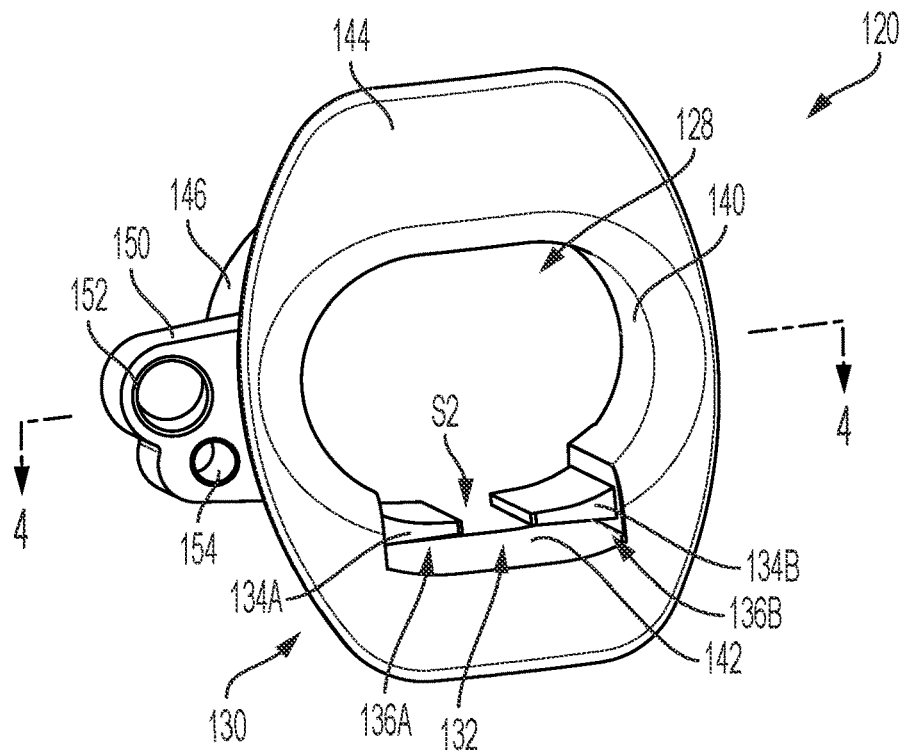
FIG. 3 is a front perspective view of a bite bar.
Figure 4:
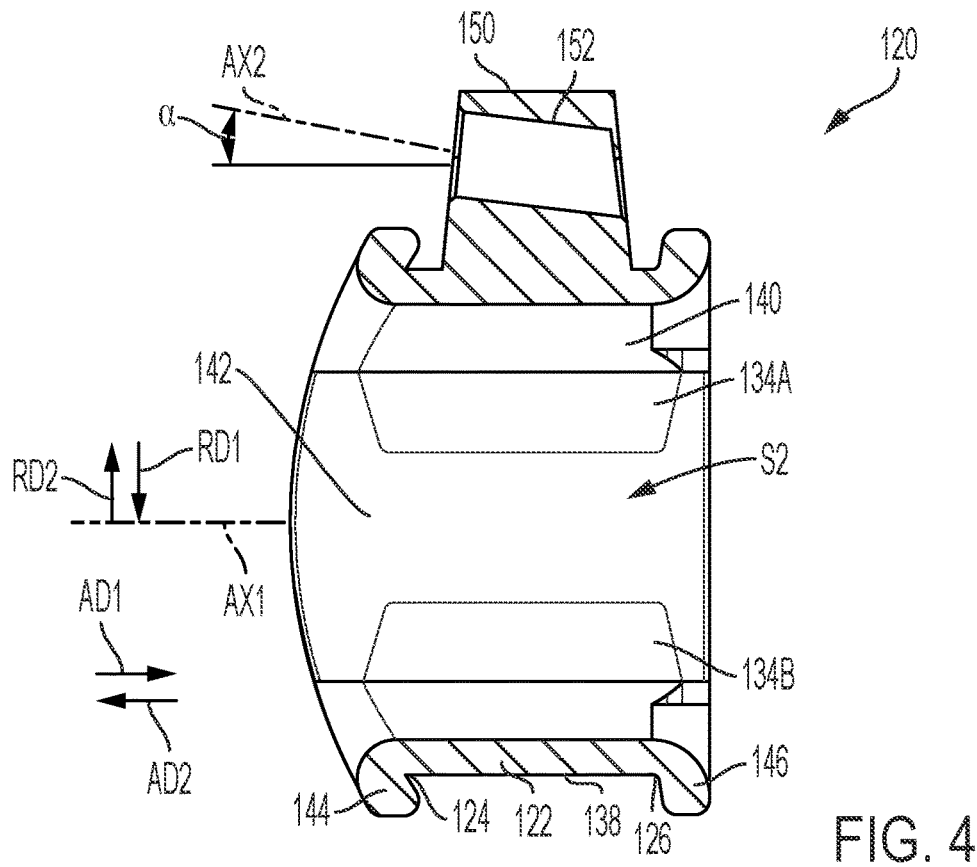
FIG. 4 is a cross-sectional view of the bite bar taken generally along line 4-4 in FIG. 3.

FIG. 3 is a front perspective view of bite bar 120. FIG. 4 is a cross-sectional view of bite bar 120 taken generally along line 4-4 in FIG. 3. Bite bar 120 generally comprises tubular section 122, protruding section 130, radially outward facing surface 138, flange 144, and flange 146. It should be appreciated that, although FIGS. 1A-B depict bite bar 20 connected to tongue restraint 60, bite bar 120 may be used in place of bite bar 20. The following description should be read in view of FIGS. 1A-B and 3-4.

Tubular section 122 extends from end 124 to end 126 and comprises hole 128 forming radially inward facing surface 140. Hole 128 is a through-hole and generally comprises an oval or ellipse shaped geometry. The geometry of hole 128, as best shown in FIG. 3, may comprises a linear top surface and a linear bottom surface, connected via two curvilinear side surfaces (i.e., similar to a super ellipse or a Cassini oval). Hole 128 extends completely through bite bar 120 (i.e., from end 124 to end 126 and through flanges 144 and 146). Axis AX1 runs through the center of hole 128. Hole 128 is operatively arranged to allow a medical professional to insert tools therethrough in order to work on a patient, for example, an endoscope.

Protruding section 130 extends from tubular section 122 generally in a radially outward direction, or in radial direction RD2. Protruding section 130 extends from end 124 to end 126 and comprises hole 132 forming radially inward facing surface 142. The geometry of hole 132, as best shown in FIG. 3, is substantially rectangular. For example, hole 132 comprises a bottom surface (i.e., radially inward facing surface 142) and two side walls extending therefrom. In some embodiments, radially inward facing surface 142 may be curvilinear. Hole 132 opens into hole 128.

Protruding section 130 further comprises two protrusions 134A-B extending from the two side walls of hole 132. As shown, protrusion 134A extends from a first side wall of hole 132 and is spaced apart from radially inward facing surface 142 forming slot 136A. Protrusion 134B extends from a second side wall of hole 132, opposite the first side wall, and is spaced apart from radially inward facing surface 142 forming slot 136B. Space S2 is formed between protrusion 134A and 134B. Space S2 is operatively arranged to engage notches 74A-B such that protrusions 134A-B can frictionally engage channels 72A-B, as will be described in greater detail below. In some embodiments, protrusions 134A and 134B comprise a curvilinear top surface (i.e., surfaces facing radially inward in radial direction RD1).

Protruding section 150 extends from tubular section 122 generally in a radially outward direction, or in radial direction RD2. Protruding section 150 comprises at least one hole, for example, hole 152 and hole 154. Hole 152 comprises center axis AX2 that is nonparallel to axis AX1. As best shown in FIG. 4, axis AX2 is arranged at angle α relative to axis AX1. In some embodiments, angle α is greater than zero. In some embodiments, angle α is 7°. It should be appreciated that hole 152 is arranged at angle α such that a tube inserted therein is directed toward axis A1 and tongue restraint 60, as will be described in greater detail below. In some embodiments, hole 154 comprises a center axis that is parallel to axis AX1. Hole 154 comprises a center axis that is parallel to axis AX1. In some embodiments, hole 154 comprises a center axis that is nonparallel to axis AX1.

In some embodiments, hole 152 comprises a diameter that is greater than the diameter of hole 154. In some embodiments, hole 152 comprises a diameter that is less than or equal to the diameter of hole 154. In some embodiments, hole 152 is operatively arranged to engage a tube connected to an oxygen supply. Such tube is fed through hole 152 in order to deliver oxygen into the patient's mouth, oral cavity, pharynx, esophagus, etc. Thus, the arrangement of hole 152 at angle α relative to axis AX1 allows such a tube to be directed radially inward, generally in radial direction RD1, such that it does not encounter resistance (i.e., get hung up on the roof of the patient's mouth or lining of the esophagus, etc.). In some embodiments, hole 154 is operatively arranged to engage a tube connected to a carbon dioxide detection device. Such tube is fed through hole 154 in order to detect carbon dioxide levels at some point with the patient's body. The other end of the tube, exterior to the patient, is connected to a carbon dioxide detector.

Flange 144 is connected to end 124 and extends radially outward therefrom, generally in radial direction RD2. Flange 144 provides a first limit to bite bar 120. Specifically, flange 144 interacts with a patient's lips and/or teeth and/or face to prevent bite bar 120, and intraoral assembly 10, from falling into a patient's mouth or oral cavity. In some embodiments, and as shown, flange 144 is generally a curvilinear plate with hole 128 and hole 132 extending therethrough. The curvilinear shape of flange 144 is such that it resembles the curvature of a patient's face, thus providing a more comfortable and secure fit. In some embodiments, flange 144 is a planar plate with hole 128 and hole 132 extending therethrough.

Flange 146 is connected to end 126 and extends radially outward therefrom, generally in radial direction RD2. Flange 146 provides a second limit to bite bar 120. Specifically, flange 146 interacts with a patient's teeth to prevent bite bar 120, and intraoral assembly 10, from falling out of a patient's mouth or oral cavity. In some embodiments, and as shown, flange 146 is generally a planar plate with hole 128 and hole 132 extending therethrough. In some embodiments, flange 146 is a curvilinear plate with hole 128 and hole 132 extending therethrough.

Tubular section 122 and protruding section 130 form radially outward facing surface 138 of bite bar 120. Radially outward facing surface 138 is operatively arranged to engage a patient's teeth. Specifically, the patient is to bite on radially outward facing surface 138 to maintain the jaw in an open position. Flange 144 and flange 146 work in conjunction to maintain bite bar 120, and thus intraoral assembly 10, aligned with the patient's teeth.

Figure 5A:
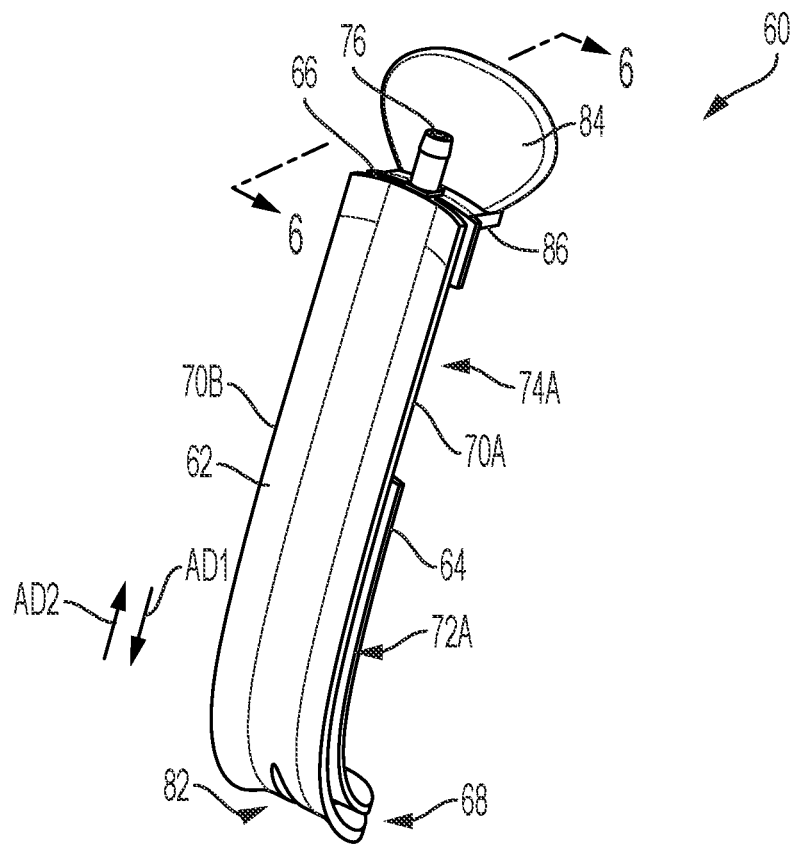
FIG. 5A is a top perspective view of a tongue restraint.
Figure 5B:
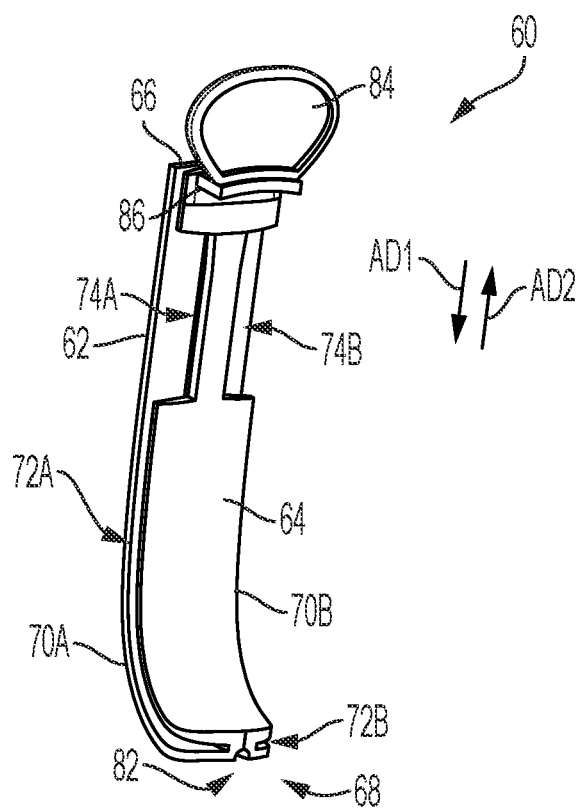
FIG. 5B is a bottom perspective view of the tongue restraint shown in FIG. 5A.
Figure 5C:
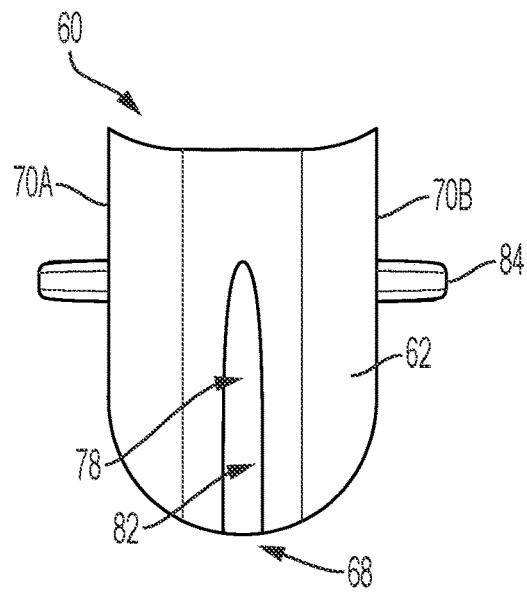
FIG. 5C is a rear elevational view of the tongue restraint shown in FIG. 5A.
Figure 5D:
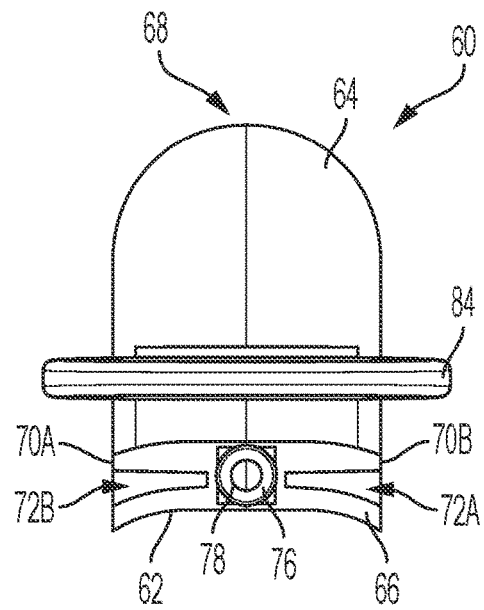
FIG. 5D is a front elevational view of the tongue restraint shown in FIG. 5A.
Figure 5E:
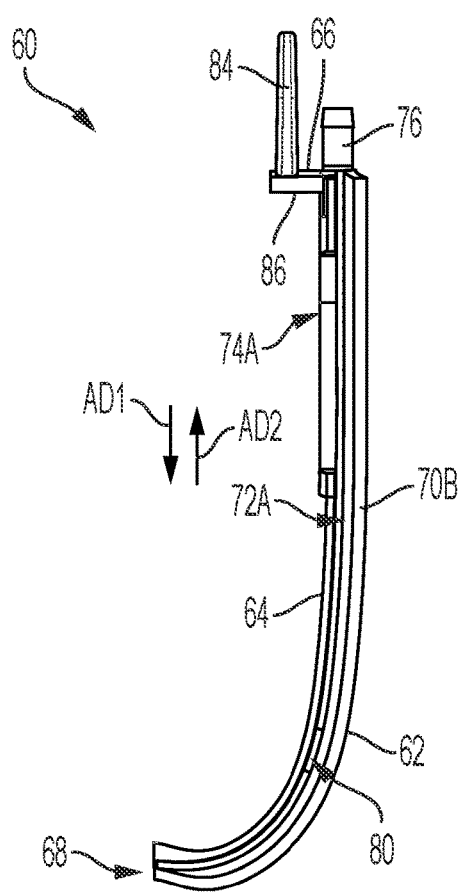
FIG. 5E is a side elevational view of the tongue restraint shown in FIG. 5A.
Figure 6:
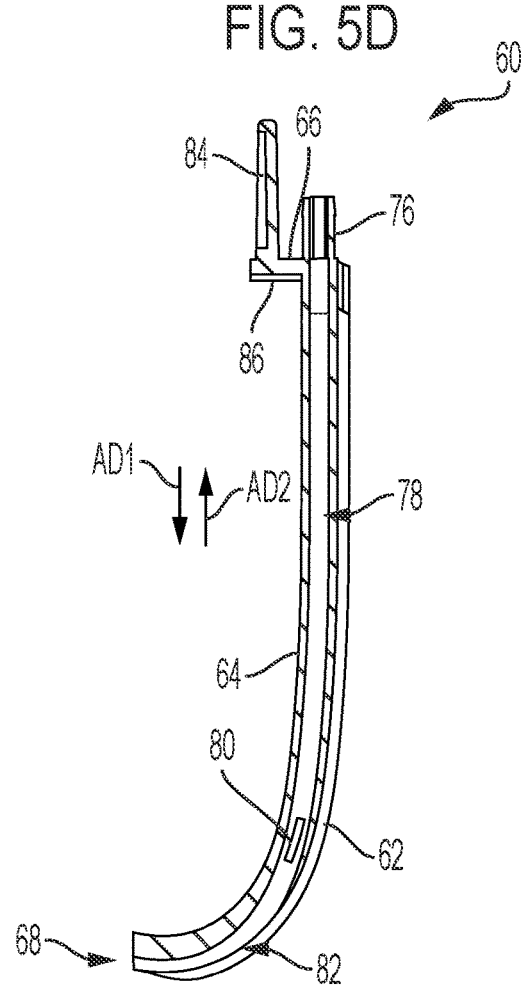
FIG. 6 is a cross-sectional view of the tongue restraint taken generally along line 6-6 in FIG. 5A.

FIG. 5A is a top perspective view of tongue restraint 60. FIG. 5B is a bottom perspective view of tongue restraint 60. FIG. 5C is a rear elevational view of tongue restraint shown 60. FIG. 5D is a front elevational view of tongue restraint 60. FIG. 5E is a side elevational view of tongue restraint 60. FIG. 6 is a cross-sectional view of tongue restraint 60 taken generally along line 6-6 in FIG. 5A. The following description should be read in view of FIGS. 1A-6.

Tongue restraint 60 generally comprises top surface 62, bottom surface 64, proximal end 66, distal end 68, lateral side 70A, and lateral side 70B. Tongue restraint 60 is generally a curvilinear plate. As best shown in FIG. 5E, tongue restraint 60 comprises a generally linear section proximate proximal end 66 and a curvilinear section proximate distal end 68 (i.e., a "J" shape). This specific geometry of tongue restraint 60 is suitable for engaging a patient's tongue, preventing such tongue from displacing into the oral cavity, pharynx, esophagus, etc., and allowing a medical professional to access the workplace without interference therefrom. In some embodiments, distal end 68 may comprise a flared portion or increased width (see FIGS. 1A-B). In some embodiments, tongue restraint 60 comprises a constant width (see FIGS. 5A-D).

Top surface 62 extends from proximal end 66 to distal end 68 and is operatively arranged to face the top of a patient's mouth or oral cavity. Top surface 62 is curvilinear in an axial direction, namely in axial direction AD1, as described above. In some embodiments, and as shown, top surface 62 is curvilinear in a lateral direction (i.e., from side 70A to side 70B). In some embodiments, top surface 62 is planar in a lateral direction (i.e., from side 70A to side 70B).

Bottom surface 64 extends from proximal end 66 to distal end 68 and is operatively arranged to face the bottom of a patient's mouth or oral cavity, namely, to interact with the patient's tongue. Bottom surface 64 is curvilinear in an axial direction, namely in axial direction AD1, as described above. In some embodiments, bottom surface 64 is curvilinear in a lateral direction (i.e., from side 70A to side 70B). In some embodiments, bottom surface 64 is planar in a lateral direction (i.e., from side 70A to side 70B).

Tongue restraint 60 further comprises channels 72A-B which extend inward from sides 70A-B, respectively. Channels 72A-B are operatively arranged to engage protrusions 34A-B, 134A-B, respectively, to fixedly secure bite bar 20, 120 to tongue restraint 60. As best shown in FIG. 5D, each of channels 72A-B comprises a planar bottom and two side walls extending therefrom to sides 70A-B. In some embodiments, the first side wall is planar and perpendicular to the bottom wall and the second side wall is curvilinear. In some embodiments, the first side wall and the second side wall are planar and perpendicular to the bottom wall. In some embodiments, the first side wall and the second side wall are curvilinear. In some embodiments, the first side wall and the second side wall are planar.

Tongue restraint 60 further comprises notches 74A-B which extend inward from sides 70A-B. Notches 74A-B allow protrusions 34A-B, 134A-B to enter channels 72A-B. For example, during assembly of bite bar 20 to tongue restraint 60, space S1 is positioned between notches 74A-B, specifically with protrusion 34A engaging notch 74A and protrusion 34B engaging notch 74, and flange directed toward proximal end 66. Bite bar 20 is then axially displaced in axial direction AD1 or axial direction AD2 with respect to tongue restraint 60. Protrusions 34A-B engage with channels 72A-B on either the side of notches 74A-B toward proximal end 66 or the side of notches 74A-B toward distal end 68. The geometry of protrusions 34A-B and channels 72A-B are such that interaction therebetween forms an interference fit (i.e., the width of channel 72A-B are less than the width of protrusions 34A-B). It should be appreciated that the same assembly procedure can be applied to bite bar 120.

Tongue restraint 60 further comprises hole 78. Hole 78 extends generally through tongue restraint 60 in an axial direction. Hole 78 extends from proximal end 66 in axial direction AD1 toward distal end 68 and is operatively arranged to deliver oxygen into a patient's mouth, oral cavity, pharynx, esophagus, etc. Hole 78 is substantially arranged between and spaced apart from top surface 62 and bottom surface 64, and between and spaced apart from side 70A and side 70B. Hole 78 begins and is open at proximal end 66. In some embodiments, hole 78 is accessible at proximal end 66 via port 76. A tube extending from an oxygen supply may be connected too port 76 to deliver oxygen thereto. In some embodiments, port 76 is integrally formed with tongue restraint 60. In some embodiments, port 76 is a separate element connected to tongue restraint (via, for example, interference fit, adhesives, etc.) Hole 78 ends at a location proximate distal end 68. In some embodiments, hole 78 ends at opening 82, which is an opening that extends from top surface 62 to hole 78. Opening 82 may be arranged at distal end 68 or at a location spaced apart from distal end 68. In some embodiments, opening 82 comprises a "V" shape that extends along top surface 62 from distal end 68. In some embodiments, hole 78 ends at one or more apertures 80—to allow a dispersion of a delivered gas (e.g., oxygen, etc.) or a delivered fluid, (e.g., medications, water, saline, etc.) instead of a singular delivery aperture.

Aperture or apertures 80 are lateral holes that extend through hole 78 from side 70A to side 70B. Thus, hole 78 opens into channels 72A-B. In some embodiments, hole 78 ends at both opening 82 and one or more lateral apertures 80. Use of apertures 80 and/or opening 82 may produce a Venturi effect or Bernoulli's principle. Specifically, the static pressure of the oxygen flowing through hole 78 will decrease after exiting hole 78 through apertures 80 and/or opening 82. The arrangement of hole 78 completely within tongue restraint 60 allows oxygen to be delivered within the patient without interfering with the use of the endoscope or other tools used by the medical professional. See also FIG. 14.

Tongue restraint 60 further comprises axial facing surface 86 proximate the proximal end 66. Surface 86 is directed generally in axial direction AD1 and is operatively arranged to engage and/or abut against flange 44, as shown in FIG. 1A in the first assembly. In some embodiments, surface 86 is curvilinear to match the curvature of flange 44. In some embodiments, surface 86 is planar. Surface 86 acts as a stop or limit for bite bar 20, 120 (i.e., surface 86 limits displacement of bite bar 20, 120 in axial direction AD2 with respect to tongue restraint 60).

In some embodiments, tongue restraint 60 further comprises tab 84 connected to proximal end 66. Tab 84 extends from proximal end 66 in axial direction AD2 and is operatively arranged to act as a handle or holder for tongue restraint 60 and the intraoral assembly. A medical professional may connect bite bar 20 to tongue restraint 60, either in the longer first assembly (FIG. 1A) or the shorter second assembly (FIG. 1B), and uses tab 84 as a handle to properly position intraoral assembly within the patient's mouth and/or oral cavity.

To use intraoral assembly 10, a bite bar is selected, for example bite bar 20 or 120. It should be appreciated that bite bars 20 and 120 may come in various sizes. For example, a larger bite bar 20, 120 may be selected for a patient having a larger jaw size, whereas a smaller bite bar 20, 120 may be selected for a child patient. As previously described, bite bar 20, 120 is engaged with tongue restraint 60. Specifically, protrusions 34A-B, 134A-B are engaged with notches 74A-B, respectively, with flange 44 directed toward surface 86. Then, based on the desired size of intraoral assembly 10, bite bar 20, 120 is displaced either in axial direction AD1 or axial direction AD2. For a longer intraoral assembly (e.g., for a larger patient), bite bar 20, 120 is displaced in axial direction AD2 (see FIG. 1A). In some embodiments, bite bar 20, 120 is displaced in axial direction AD2 until flange 44 abuts against surface 86. For a shorter intraoral assembly (e.g., for a smaller patient), bite bar 20, 120 is displaced in axial direction AD1. The engagement of protrusions 34A-B, 134A-B with channels 72A-B result in a friction or interference fit, thus securing bite bar 20, 120 to tongue restraint 60. Intraoral assembly 10 is then inserted into the patient. Specifically, distal end 68 is inserted into the patient's mouth with bottom surface 64 directed toward the patient's tongue until bite bar 20, 120 is aligned with the patient's teeth. The patient's teeth are positioned on or engaged with radially outward facing surface 38, 138 and between flanges 44, 144 and 46, 146, with flange 46, 146 arranged internal and flange 44, 144 arranged external to the patient. A tube is then connected to port 76 to supply oxygen to hole 78 and thus to the patient's mouth, oral cavity, pharynx, esophagus, etc. It should be appreciated that the tube may be connected to port 76 after positioning intraoral assembly 10 within the patient or before insertion of intraoral assembly 10 into the patient. The tube is arranged to be connected to an oxygen supply or source.

In some embodiments, a tube is then inserted into the patient through hole 152 and/or hole 154. The tubes can be engaged with holes 152 and 154 after positioning intraoral assembly 10 within the patient or before insertion of intraoral assembly 10 into the patient. Such tubes may be connected to an oxygen supply and/or a carbon dioxide detection device.

In some embodiments, intraoral assembly 10 further comprises strap 12. As shown in FIGS. 1A-B, strap 12 comprises end 14A, end 14B and a plurality of apertures 16 spaced apart therealong. In some embodiment, bite bar 20, 120 further comprise radially extending connectors or protrusions 48A-B. Connectors 48A-B are operatively arranged to engage apertures 16 to connect strap 12 to bite bar 20 and thus intraoral assembly 10. After apertures 16 are connected to connectors 48A-B, strap 12 is arranged around the patient's head to secure intraoral assembly 10 in position. Apertures 16 are spaced apart along strap 12 such that the length of strap 12 is adjustable based on the size of a patient's head. In some embodiments, connectors 48A-B are "T" shaped. in some embodiments, strap 12 comprises one of male snaps and female straps and connectors comprises the other of male snaps and female snaps. It should be appreciated that intraoral assembly 10 may comprise any means suitable for adjustably connecting strap 12 to bite bar 20. It should be appreciated that in some embodiments, bit bar 20 and tongue restraint 60 are integrally formed.

Alternative Embodiments of the Intraoral Assembly

Figure 7A:
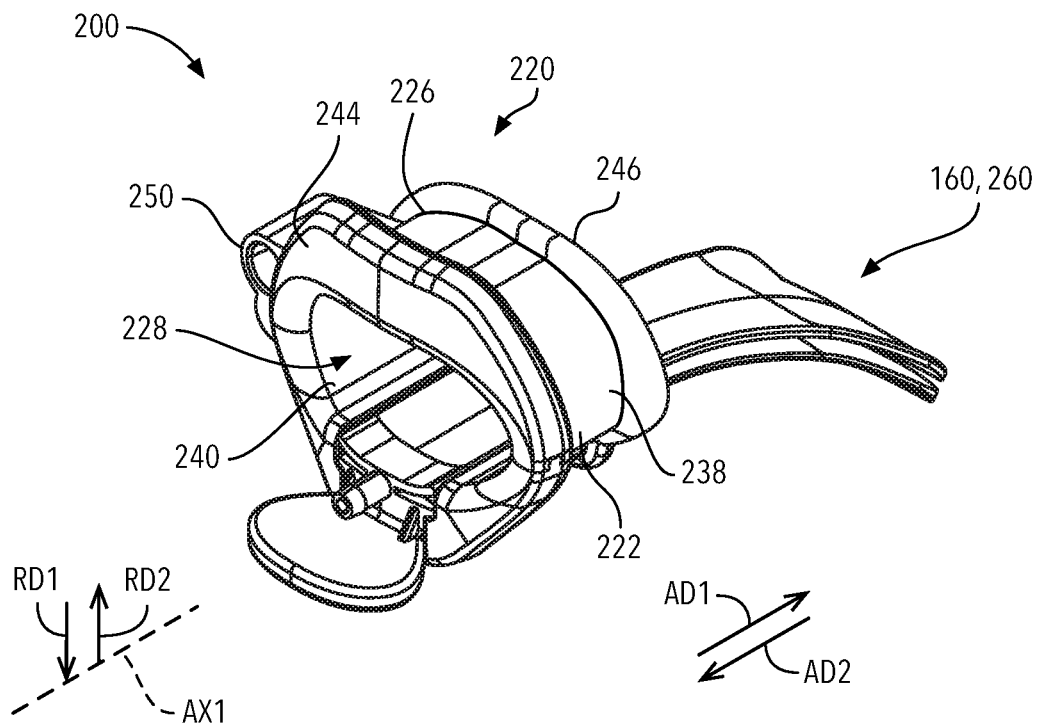
FIG. 7A is a perspective view of a second embodiment of an intraoral assembly.
Figure 7B:
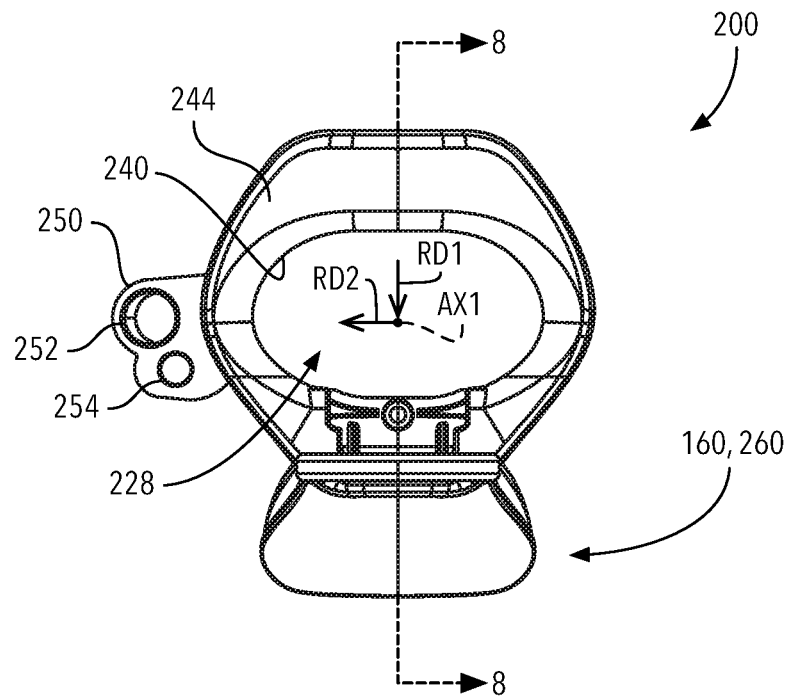
FIG. 7B is a front view of the second embodiment of the intraoral assembly shown in FIG. 7A.
Figure 8:
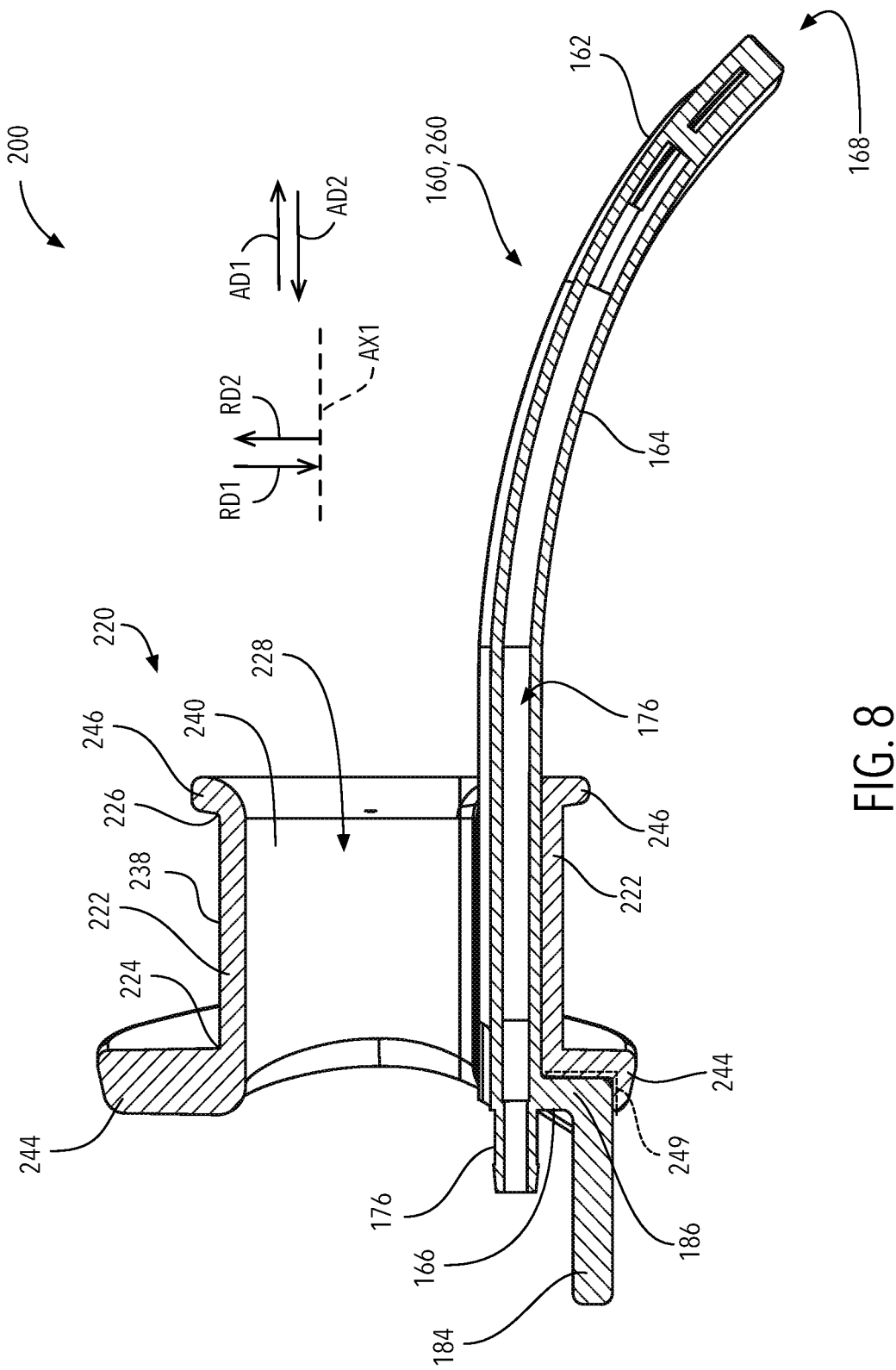
FIG. 8 a cross-sectional view of the second embodiment of the intraoral assembly shown in FIG. 7A taken generally along line 8-8 in FIG. 7B.

The following description should be taken in view of FIGS. 7A through 8. FIG. 7A is a perspective view of a second embodiment of intraoral assembly 200, FIG. 7B is a front view of intraoral assembly 200, and FIG. 8 is a cross-sectional view of intraoral assembly 200 taken generally along line 8-8 in FIG. 7B. Intraoral assembly 200 comprises a third embodiment of the bite bar, bite bar 220 which comprises all of the components of bite bar 120, indicated by reference numbers in the "200" series, e.g., flange is indicated by 144 in FIG. 3 and is indicated by 244 in FIGS. 7A through 8. Bite bar 220 also includes indentation 249, best illustrated in FIG. 8. Indentation 249 is arranged within flange 244. Indentation 249 is arranged to accept extension 186 of tongue restraint 160 or tongue restraint 260 when attached to bite bar 220—providing further restriction of radial movement of secured tongue restraint 160 or tongue restraint 260 within bite bar 220.

Figure 9A:
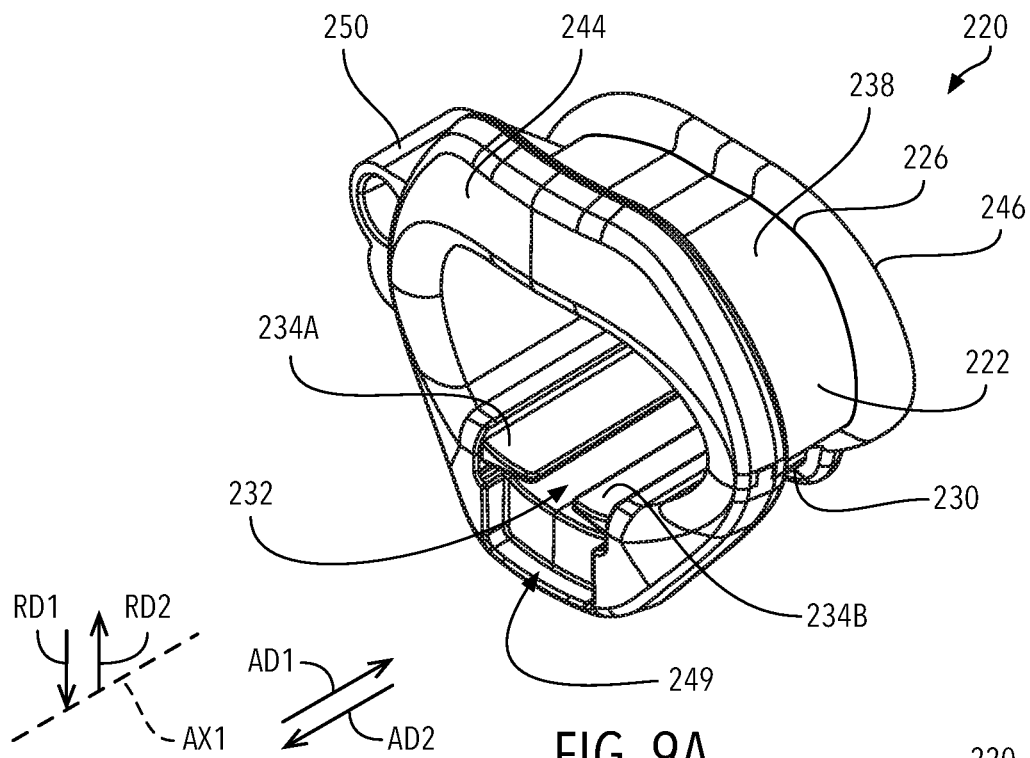
FIG. 9A is a perspective view of a second embodiment of the bite bar of the intraoral assembly shown in FIG. 7A.
Figure 9B:
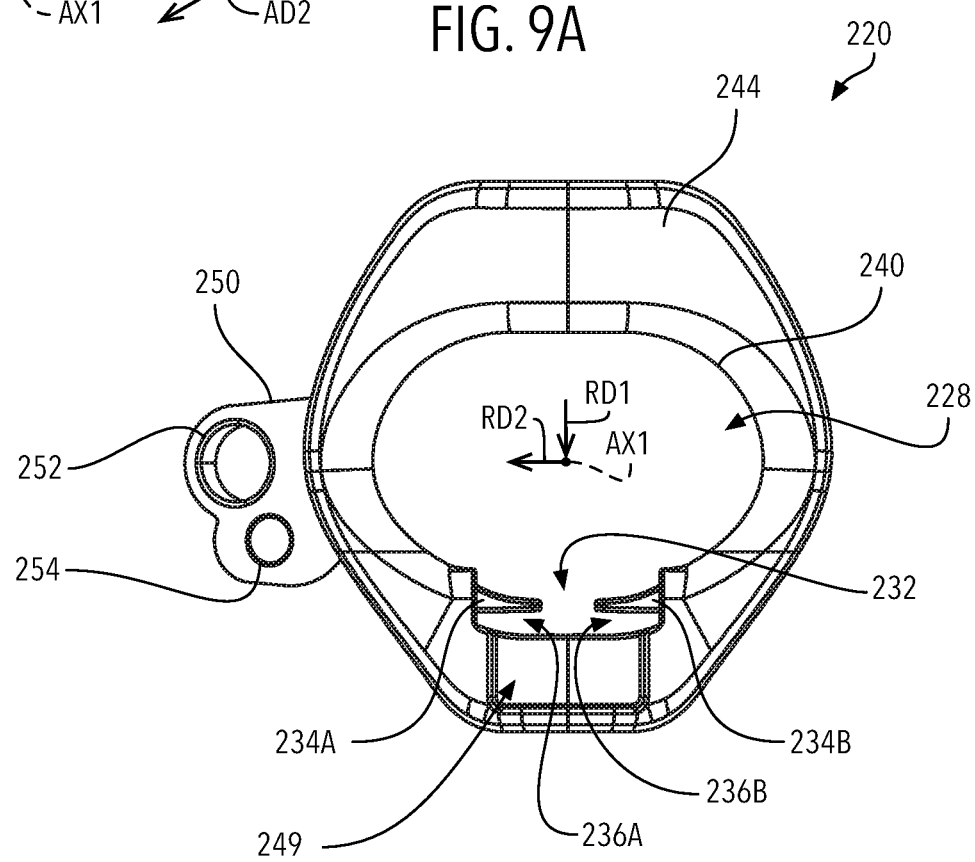
FIG. 9B is a front view of the second embodiment of the bite bar shown in FIG. 8A.

The following description should be taken in view of FIGS. 9A and 9B. FIG. 9A is a perspective view of third embodiment of bite bar 220 of intraoral assembly 200 and FIG. 9B is a front view of the same. Indentation 249 is preferably arranged distally in relation to slots 236A and 236B. Indentation 249, in a preferred embodiment, opens into hole 232, and slots 236A and 236B. Indentation 249 of bite bar 220 is the sole structural difference between bite bar 220 and bite bar 120 (shown in FIG. 3 and discussed supra).

Figure 10:
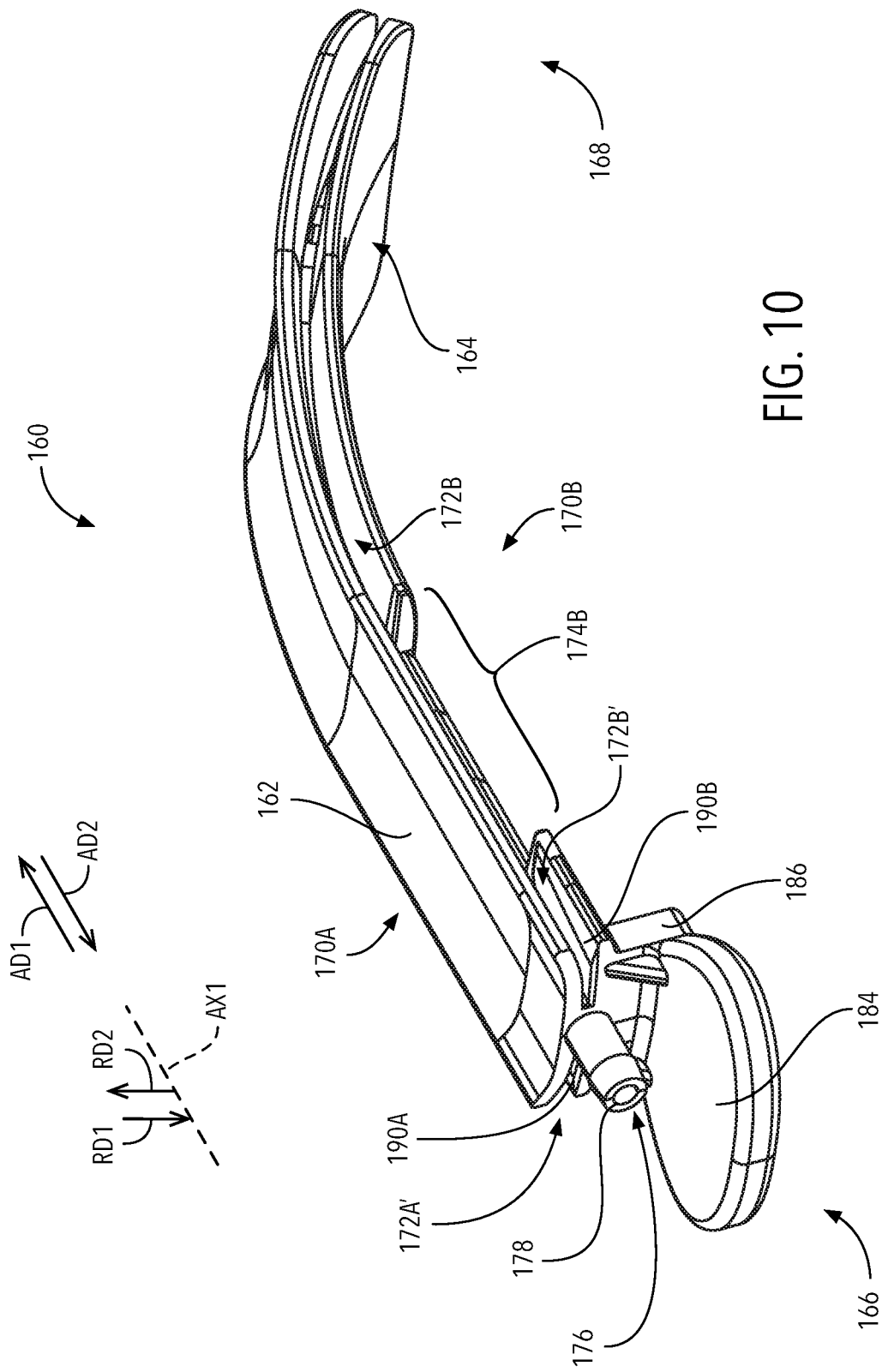
FIG. 10 is a perspective view of a second embodiment of the tongue restraint of the intraoral assembly shown in FIG. 7A.

FIG. 10 is a perspective view of the second embodiment of the tongue restraint, tongue restraint 160, of intraoral assembly 200 (shown in FIGS. 7A through 8). It should be appreciated that tongue restraint 160 includes all of the components of tongue restraint 60 (shown in FIGS. 5A through 6), whereas equivalent structural components share base reference numerals, i.e., proximal end 66 of tongue restraint 60 is the structural equivalent of proximal end 166 of tongue restraint 160, etc. The sole difference between tongue restraint 160 and tongue restraint 60 is the presence of protrusions 190A and 190B which are preferably arranged distally within tapered channels 172A' and 172B', respectively—alternatively arranged on bases 173B' and 177B' of channels 172A' and 172B', respectively.

Figure 11:
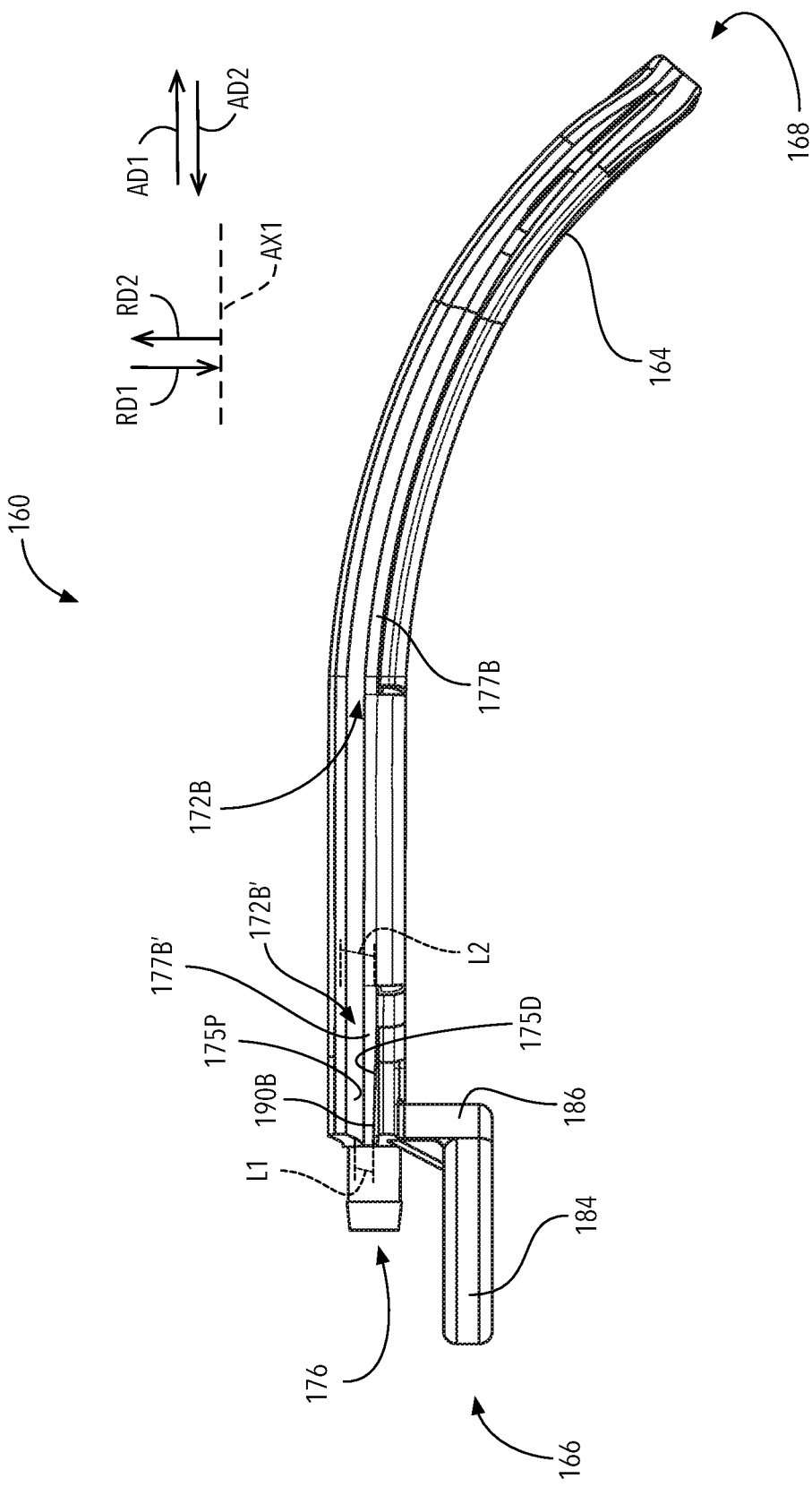
FIG. 11 is a right-side view of the second embodiment of the tongue restraint shown in FIG. 10.

FIG. 11 is a right-side view of tongue restraint 160. It should be appreciated that the following description of tapered channel 172B' and channel protrusion 190B also applies to tapered channel 172A' its respective channel protrusion 190A. Tapered channel 172B' includes distal surface 175D and proximal surface 175P, whereas tapered channel 172A' includes distal surface 173D and proximal surface 173P (not shown). Tapered channel 172B' includes channel protrusion 190B which extends from distal surface 175D. In a preferred embodiment, channel protrusion 190B is integral with distal surface 175D. Channel protrusion 190B is preferably arranged within tapered channel 172B' proximate to proximal end 166 of tongue restraint 160.

Tapered channel 172B' preferably has a taper, i.e., the distance between distal surface 175D or channel protrusion 190B and proximal surface 175P, that increases in the direction towards distal end 168 of tongue restraint 160. Length L1 is defined by the distance of the surface of channel protrusion 190B and proximal surface 175P. Length L2 is defined by the distance of distal surface 175D and proximal surface 175P. Length L1 is less than length L2.

Figure 12:
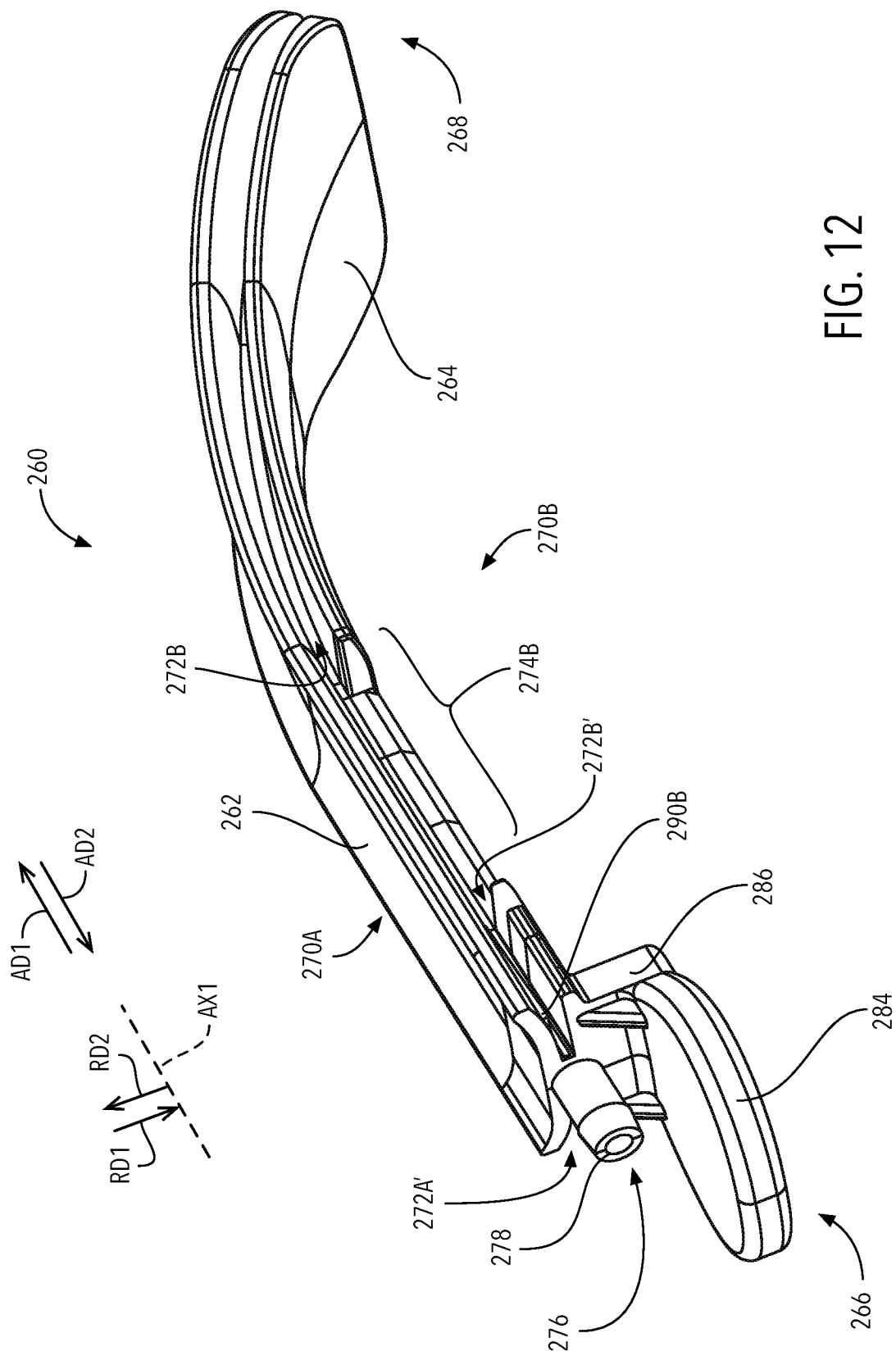
FIG. 12 is a perspective view of a third embodiment of the tongue restraint of the intraoral assembly shown in FIG. 7A.

FIG. 12 a perspective view of the third embodiment of the tongue restraint, tongue restraint 260, of intraoral assembly 200 (shown in FIGS. 7A through 8). It should be appreciated that tongue restraint 260 includes all of the components of tongue restraint 60 (shown in FIGS. 5A through 6), whereas equivalent structural components share base reference numerals, i.e., proximal end 66 of tongue restraint 60 is the structural equivalent of proximal end 266 of tongue restraint 260, etc. The sole difference between tongue restraint 260 and tongue restraint 60 is the presence of protrusions 290A (not shown) and 290B which are preferably arranged proximate to top surface 262 within tapered channels 272A' and 272B', respectively—alternatively arranged on bases 273B' and 277B' of channels 272A' and 272B', respectively. The sole difference between tongue restraint 160 (shown in FIGS. 10 and 11) is the arrangement of the channel protrusions (190A and 190B in tongue restraint 160).

Figure 13:
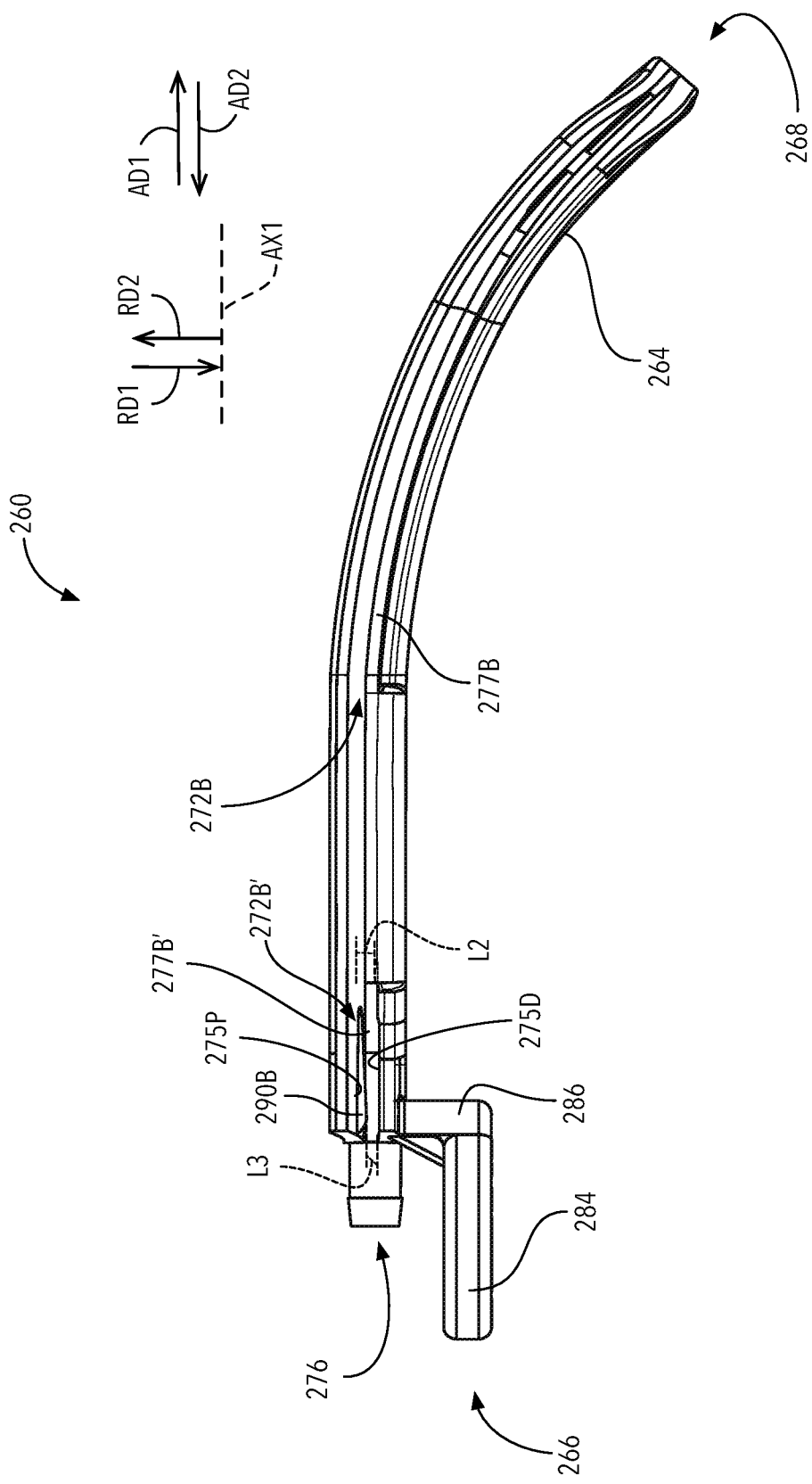
FIG. 13 is a right-side view of the third embodiment of the tongue restraint shown in FIG. 12; and, FIG. 14 is a top plan skeleton view of the tongue restraint shown in FIGS. 10 and 12.

FIG. 13 is a right-side view of tongue restraint 260. It should be appreciated that the following description of tapered channel 272B' and channel protrusion 290B also applies to tapered channel 272A' (not shown) its respective channel protrusion 290A (not shown). Tapered channel 272B' includes distal surface 275D and proximal surface 275P, whereas tapered channel 272A' includes distal surface 273D and proximal surface 273P (not shown). Tapered channel 272B' includes channel protrusion 290B which extends from proximal surface 275P. In a preferred embodiment, channel protrusion 290B is integral with proximal surface 275P. Channel protrusion 290B is preferably arranged within tapered channel 272B' proximate to proximal end 266 of tongue restraint 260.

Tapered channel 272B' preferably has a taper, i.e., the distance between proximal surface 275P or channel protrusion 190B and distal surface 275D, that increases in the direction towards distal end 168 of tongue restraint 160. Length L3 is defined by the distance of the surface of channel protrusion 290B and distal surface 275D. Length L2 is defined by the distance of distal surface 275D and proximal surface 275P. Length L3 is less than length L2.

Figure 14:
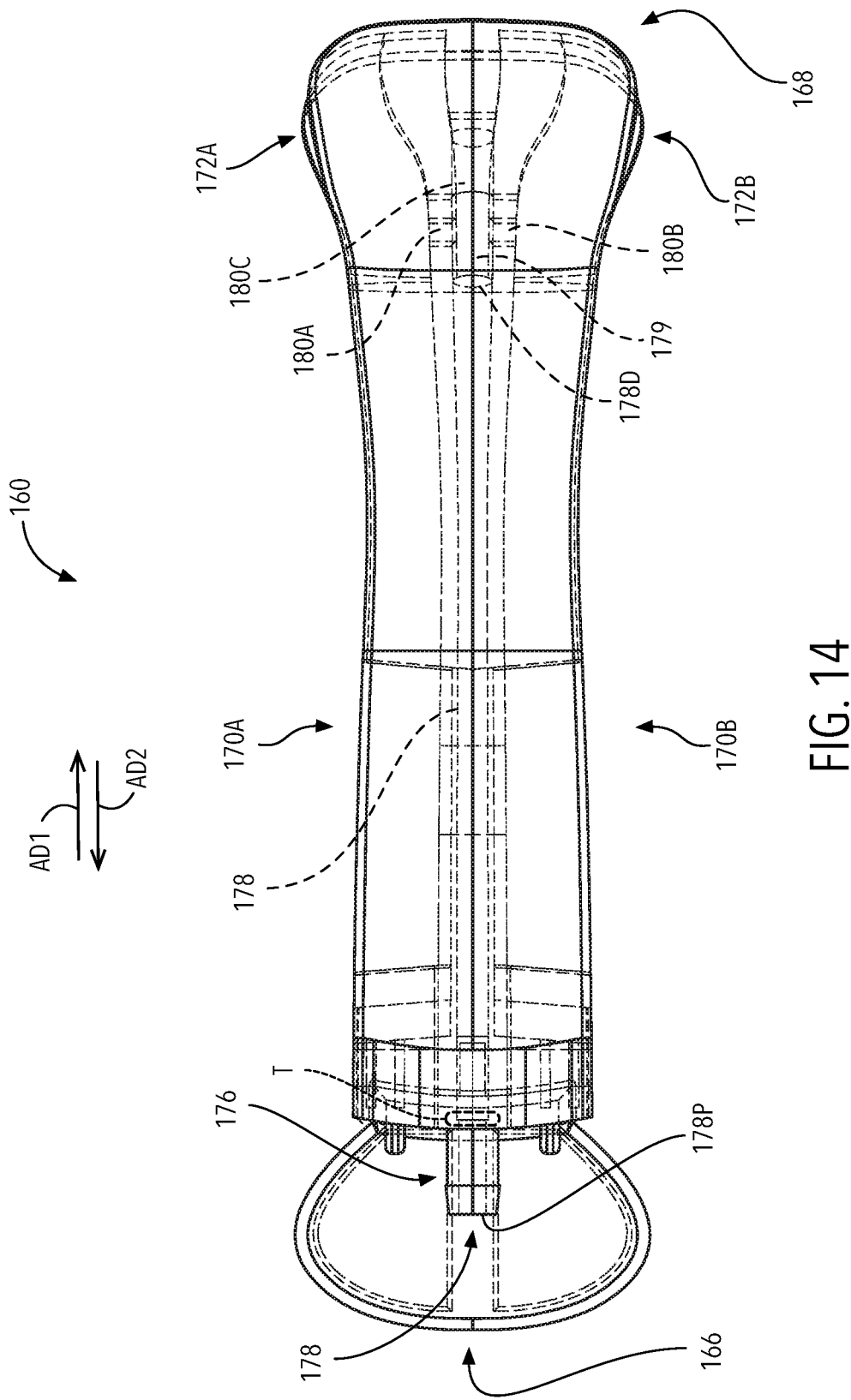

FIG. 14 illustrates a skeleton top plan view (illustrating hidden components via broken lines) of tongue restraint 160. The following description applies to both tongue restraint 160, and 260. Hole 178 extends through tongue restraint 160 from proximal end 166 (proximal opening 178P) to distal end 168 (distal opening 178D). Distal opening 178D opens into split opening 179 which comprises first exit opening 180A within curved channel 172A, second exit opening 180B within curved channel 172B, and third exit opening 180C which is within both curved channels 172A and 172B—to allow a dispersion of a delivered gas (e.g., oxygen, etc.) or a delivered fluid, (e.g., medications, water, saline, etc.) instead of a singular delivery aperture. Exit openings 180A-180C may produce a Venturi effect or Bernoulli's principle. Specifically, the static pressure of the oxygen (or fluid) flowing through hole 178 will decrease after exiting distal opening 178D through exit openings 180A-180C (also after exiting transition T proximate port 176, where transition T indicates where the diameter of hole 178 generally increases compared to the diameter of hole 178 within port 176). The arrangement of hole 178 completely within tongue restraint 160 allows oxygen to be delivered within the patient without interfering with the use of the endoscope or other tools used by the medical professional. It should be appreciated that split opening 179 may only be bifurcated (i.e., having only exit openings 180A and 180B), or may alternatively be quadfurcated (four exit openings), pentfurcated (five exit openings), hexfurcated (six exit openings), etc.

The following description should be taken in view of all of the aforementioned figures. Intraoral assembly 200 features a removable and frictionally secured connection between bite bar 220 and either tongue restraint 160 or 260. The frictional connection between bite bar 220 and either tongue restraint 160 or 260 is togglable, that is, the two components may be connected or disconnected. To facilitate a secure removable connection, tongue restraints 160 and 260 include channels having protruding members (channel 172A' has channel protrusion 190A; channel 172B' has channel protrusion 190B; channel 272A' has channel protrusion 290A; and, channel 272B' has channel protrusion 290B). The protrusions of the channels of tongue restraints 160 and 260 create a tapered configuration therein, thereby increasing the frictional securement of protrusions 234A and 234B of bite bar 220, as tongue restraint 160 or 260 is slideably and frictionally engaged thereto—significantly restricting radially movement of tongue restraints 160 or 260 secured to bite bar 220 (substantially no movement in either radial direction RD1 or RD2) and additionally increasing the force required in axial direction AX2 to displace tongue restraints 160 or 260 from bite bar 220. The frictional securement is greatest when extensions 186 and 286 of tongue restraints 160 and 260 is seated within indentation 249 of bite bar 220, in other words, no additional axial movement in axial direction AX1.

In some embodiments, tongue restraints 160 and 260 allow intraoral assembly 200 to have a "longer" and a "shorter" configuration, that is, tongue restraints 160 and 260 may be secured to bite bar 220 in either the pair of tapered channels (longer) or in the pair of curved channels (shorter). Longer and shorter should be interpreted to mean the length that tongue restraints 160 and 260 extend into a patient's mouth during use and/or the position that tongue restraints 160 or 260 are removably secured to bite bar 220 (or bite bars 20 and 120). It should also be noted that this longer and shorter configuration also applies to tongue restraint 60, as discussed supra.

It should also be appreciated that in some embodiments, bases 173B' and 177B' of tongue restraint 160 (along with bases 273B' and 277B' of tongue restraint 260) may alternatively have the aforementioned protrusions arranged thereon.

It should be further appreciated that the aforementioned protrusions are akin to shims—a thin and often tapered or wedged piece of material, used to fill small gaps or spaces between objects. Shims are typically used in order to support, adjust for better fit, or provide a level surface and/or increase the frictional contact between two objects. Shims may also be used as spacers to fill gaps between parts subject to wear. In some embodiments the protrusions may alternatively comprise a plurality of protruding members, i.e., "bumps".

It should also be noted that, in alternative embodiments, bite bar 220 may also include connectors or protrusions 48A and 48B (shown in FIGS. 1A and 1B) extending from tubular section 222 to facilitate the use of strap 12 (shown in FIGS. 1A and 1B). One of connectors or protrusions 48A and 48B, could extend from protruding section 250 of bite bar 220.

It should also be appreciated that in other embodiments, bite bar 220 may not include protruding section 250.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the claims.

LIST OF REFERENCE NUMERALS

10 Intraoral assembly
12 Strap
14A End
14B End
16 Apertures
20 Bite bar
22 Tubular section
24 End
26 End
28 Hole
30 Protruding section
32 Hole
34A Protrusion
34B Protrusion
36A Slot
36B Slot
38 Radially outward facing surface
40 Radially inward facing surface
42 Radially inward facing surface
44 Flange
46 Flange
48A Connector or protrusion
48B Connector or protrusion
60 Tongue restraint
62 Top surface
64 Bottom surface
66 Proximal end
68 Distal end
70A Side
70B Side
72A Channel
72B Channel
74A Notch
74B Notch
76 Port
78 Hole
80 Aperture or apertures
82 Opening
84 Tab
86 Surface
120 Bite bar
122 Tubular section
124 End
126 End
128 Hole
130 Protruding section
132 Hole
134A Protrusion
134B Protrusion
136A Slot
136B Slot
138 Radially outward facing surface
140 Radially inward facing surface
142 Radially inward facing surface
144 Flange
146 Flange
150 Protruding section
152 Hole
154 Hole
160 Second embodiment of the tongue restraint of intraoral assembly 200

162 Top surface of tongue restraint 160
164 Bottom surface of tongue restraint 160
166 Proximal end of tongue restraint 160
168 Distal end of tongue restraint 160
170A Side of tongue restraint 160
170B Side of tongue restraint 160
172A Channel of tongue restraint 160
172A' Tapered channel of tongue restraint 160
172B Channel of tongue restraint 160
172B' Tapered channel of tongue restraint 160
173B Base of channel 172A
173B' Base of channel 172A'
173D Proximal surface of tapered channel 172A'
173P Distal surface of tapered channel 172A'
174A Notch of tongue restraint 160
174B Notch of tongue restraint 160
175D Proximal surface of tapered channel 172B'
175P Distal surface of tapered channel 172B'
176 Port of tongue restraint 160
177B Base of channel 172B
177B' Base of channel 172B'
178 Hole of tongue restraint 160
178D Distal opening of hole 178
178P Proximal opening of hole 178
179 Spilt opening of hole 178
180A Exit opening
180B Exit opening
180C Exit opening
184 Tab of tongue restraint 160
186 Extension of tongue restraint 160
190A Protrusion of tapered channel 172A'
190B Protrusion of tapered channel 172B'
200 Second embodiment of the intraoral assembly
220 Third embodiment of the bite bar of intraoral assembly 200
222 Tubular section of bite bar 220
224 End of bite bar 220
226 End of bite bar 220
228 Through-bore of bite bar 220
238 Radially outward facing surface of bite bar 220
240 Radially inward facing surface of bite bar 220
242 Radially inward facing surface of bite bar 220
244 Flange of bite bar 220
246 Flange of bite bar 220
249 Indentation of bite bar 220
250 Protruding section of bite bar 220
252 Hole of bite bar 220
254 Hole of bite bar 220
260 Third embodiment of the tongue restraint of intraoral assembly 260
262 Top surface of tongue restraint 260
264 Bottom surface of tongue restraint 260
266 Proximal end of tongue restraint 260
268 Distal end of tongue restraint 260
270A Side of tongue restraint 260
270B Side of tongue restraint 260
272A Channel of tongue restraint 260
272A' Tapered channel of tongue restraint 260
272B Channel of tongue restraint 260
272B' Tapered channel of tongue restraint 260
273B Base of channel 272A
273B' Base of channel 272A'
274A Notch of tongue restraint 260
274B Notch of tongue restraint 260
276 Port of tongue restraint 260
277B Base of channel 272B
277B' Base of channel 272B'
278 Hole of tongue restraint 260
280 Aperture or apertures of tongue restraint 260
282 Opening of tongue restraint 260
284 Tab of tongue restraint 260
286 Extension of tongue restraint 260
290A Protrusion of tapered channel 272A'
290B Protrusion of tapered channel 272B'
AD1 Axial direction
AD2 Axial direction
AX1 Axis
AX2 Axis
L1 First length
L2 Second length
L3 Third length
RD1 Radial direction
RD2 Radial direction
S1 Space
S2 Space
T Transition of hole 178
α Angle

What is claimed is:
1. An intraoral assembly for endoscopy, comprising:
a bite bar, including:
a tubular section comprising a first end and a second end;
a first flange arranged at said first end;
a second flange arranged at said second end;
a first through-hole;
an indentation arranged within said first flange, said indentation opening into said through-hole; and,
a tongue restraint, including:
a proximal end;
a distal end;
a top surface;
a bottom surface;
a first side having a first channel arranged therein, said first channel having a channel protrusion arranged therein;
a second side having a second channel arranged therein, said second channel having a channel protrusion arranged therein; and,
a hole extending from said proximal end to a location proximate said distal end;
wherein said bite bar is adjustably and removably connectable to said tongue restraint.

2. The intraoral assembly as recited in claim 1, wherein said tongue restraint further comprises an extension extending from said proximal end, said extension is further arranged to be frictionally seated within said indentation of the bite bar when said tongue restraint is connected to said bite bar.

3. The intraoral assembly as recited in claim 1, wherein said tongue restraint is curvilinear toward said bottom surface.

4. The intraoral assembly as recited in claim 1, wherein said bite bar further comprises a second through-hole extending radially outward from and connected to said first through-hole, said second through-hole comprising at least one through-hole protrusion operatively arranged to engage at least one of said first channel and said second channel.

5. The intraoral assembly as recited in claim 4, wherein said at least one through-hole protrusion comprises:
a first through-hole protrusion extending in a first direction and operatively arranged to engage said first channel; and, a second through-hole protrusion extending in a second direction, opposite said first direction, and operatively arranged to engage said second channel;

wherein a space is arranged between said first through-hole protrusion and said second through-hole protrusion.

6. The intraoral assembly as recited in claim 5, wherein:
said tongue restraint further comprises a first notch in said bottom surface and extending from said first side and a second notch in said bottom surface and extending from said second side; and,
said first protrusion and said second protrusion are operatively arranged to engage said first notch and said second notch, respectively, to align said first protrusion and said second protrusion with said first channel and said second channel, respectively.

7. The intraoral assembly as recited in claim 1, wherein said location is an opening in said bottom surface.

8. The intraoral assembly as recited in claim 7, wherein said opening is connected to said distal end.

9. The intraoral assembly as recited in claim 1, wherein said location is at least one aperture extending from said first side to the second side.

10. The intraoral assembly as recited in claim 1, wherein said bite bar further comprises a protruding section extending radially outward from said tubular section, said protruding section comprising at least one through-bore.

11. The intraoral assembly as recited in claim 10, wherein:
said first through-hole comprises a first center axis; and,
said at least one through-bore comprises a second center axis, said second center axis being arranged at an angle relative to said first center axis, said angle being greater than zero.

12. The intraoral assembly as recited in claim 1, further comprising a port connected to said hole and extending from said proximal end.

13. An intraoral assembly, comprising:
a bite bar, said bite bar having a tubular section terminating at a pair of respective flanges arranged at opposite ends thereof, said tubular section including a through hole therein, said through hole having a channel disposed distally in relation to said through hole, said channel including a pair of protrusions arranged oppositely within said channel, at least one of said pair of flanges including an indentation therein, said indentation open to said channel, a protruding section extending from said tubular section comprising at least one through-bore; and,
a tongue restraint, said tongue restraint having a proximal end, a distal end, an extension extending from said proximal end, a first side having a first channel arranged therein, said first channel having a channel protrusion arranged therein, a second side having a second channel arranged therein, said second channel having a channel protrusion arranged therein, a hole extending from said proximal end to a location proximate said distal end, wherein said bite bar is adjustably and removably connectable to said tongue restraint.

14. The intraoral assembly recited in claim 13, wherein said pair of flanges comprises a first flange and a second flange, said indentation arranged within said first flange.

15. The intraoral assembly recited in claim 13, wherein said extension is further arranged to be frictionally seated within said indentation of said bite bar when said tongue restraint is connected to said bite bar.

16. The intraoral assembly recited in claim 13, wherein:
said through-hole comprises a first center axis; and,
said at least one through-bore comprises a second center axis, said second center axis being arranged at an angle relative to said first center axis, said angle being greater than zero.

17. The intraoral assembly recited in claim 13, wherein said tongue restraint is curvilinear toward a bottom surface, said tongue restraint further comprising a first curved channel arranged on said first side proximate said distal end and a second curved channel arranged on said second side proximate said distal end.

18. The intraoral assembly as recited in claim 17, wherein:
said tongue restraint further comprises a first notch in said bottom surface and extending from said first side and a second notch in said bottom surface and extending from said second side; and,
said pair of protrusions are operatively arranged to engage said first notch and said second notch, respectively, to align said pair of protrusions with a group consisting of:
said first channel and said second channel; and,
said first curved channel and said second curved channel.

19. The intraoral assembly as recited in claim 13 wherein said tongue restraint further comprises a first curved channel arranged on said first side, a second curved channel arranged on said second side, wherein said pair of protrusions of said channel of said bite bar are arranged to engage a group consisting of:
said first and second channels of said tongue restraint; and,
said first and second curved channels of said tongue restraint;
thereby removably securing said tongue restraint to said channel of said bite bar.

20. The intraoral assembly as recited in claim 13, wherein said hole of said tongue restraint comprises of plurality of openings proximate said distal end of said hole.

* * * * *